(12) United States Patent
Imamura

(10) Patent No.: US 9,182,602 B2
(45) Date of Patent: Nov. 10, 2015

(54) IMAGE PICKUP DEVICE AND RANGEFINDER DEVICE

(75) Inventor: Norihiro Imamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/700,174

(22) PCT Filed: Dec. 28, 2011

(86) PCT No.: PCT/JP2011/007353
§ 371 (c)(1),
(2), (4) Date: Nov. 27, 2012

(87) PCT Pub. No.: WO2012/120584
PCT Pub. Date: Sep. 13, 2012

(65) Prior Publication Data
US 2013/0070146 A1    Mar. 21, 2013

(30) Foreign Application Priority Data
Mar. 7, 2011   (JP) .................................. 2011-049176

(51) Int. Cl.
*H04N 5/225* (2006.01)
*G02B 27/10* (2006.01)
(Continued)

(52) U.S. Cl.
CPC ................ *G02B 27/10* (2013.01); *H04N 5/225* (2013.01); *H04N 5/2254* (2013.01); *H04N 5/2355* (2013.01); *H04N 13/0217* (2013.01); *G01S 11/12* (2013.01)

(58) Field of Classification Search
CPC .................................................... H04N 1/19526
USPC ................................... 348/335; 359/368, 478
See application file for complete search history.

(56) References Cited

U.S. PATENT DOCUMENTS

| 5,289,286 A | 2/1994 | Nakamura et al. |
| 5,519,533 A * | 5/1996 | Nomura et al. ............... 359/478 |

(Continued)

FOREIGN PATENT DOCUMENTS

| EP | 1 432 241 A2 | 6/2004 |
| JP | 05-030350 A | 2/1993 |

(Continued)

OTHER PUBLICATIONS

European Search Report for corresponding European Application No. 11860683.9, mailed Jan. 8, 2014.

(Continued)

*Primary Examiner* — Roberto Velez
*Assistant Examiner* — Stephen Coleman
(74) *Attorney, Agent, or Firm* — Renner, Otto, Boisselle & Sklar, LLP

(57) ABSTRACT

An imaging apparatus according to the present invention includes a lens optical system L, an imaging device N at least having a plurality of first and second pixels P1 and P2, an array optical device K, and a signal processing section C for generating an image. The lens optical system L has an optical region D1 and an optical region D2; the array optical device K causes light passing through the optical regions D1 and D2 to respective enter the plurality of first and second pixels P1 and P2; and a proportion of an amount of light exiting the optical region D2 relative to an amount of light entering the optical region D2 is smaller than a proportion of an amount of light exiting the optical region D1 relative to an amount of light entering the optical region D1.

16 Claims, 20 Drawing Sheets

(51) Int. Cl.
*H04N 5/235* (2006.01)
*H04N 13/02* (2006.01)
*G01S 11/12* (2006.01)

(56) References Cited

U.S. PATENT DOCUMENTS

| | | | |
|---|---|---|---|
| 2003/0231880 A1* | 12/2003 | Irving et al. | 396/322 |
| 2004/0145672 A1 | 7/2004 | Sugimoto | |
| 2005/0110104 A1* | 5/2005 | Boettiger et al. | 257/432 |
| 2007/0296843 A1 | 12/2007 | Kasuga et al. | |
| 2009/0027542 A1 | 1/2009 | Yamamoto et al. | |
| 2009/0135282 A1 | 5/2009 | Gidon | |
| 2009/0309999 A1 | 12/2009 | Hirai et al. | |
| 2009/0314928 A1 | 12/2009 | Parks | |
| 2010/0253799 A1 | 10/2010 | Mabuchi | |
| 2010/0328517 A1* | 12/2010 | Mathieu | 348/340 |

FOREIGN PATENT DOCUMENTS

| | | |
|---|---|---|
| JP | 07-322142 A | 12/1995 |
| JP | 2002-101347 A | 4/2002 |
| JP | 2003-264842 A | 9/2003 |
| JP | 2004-222184 A | 8/2004 |
| JP | 2005-176116 A | 6/2005 |
| JP | 2007-329721 A | 12/2007 |
| JP | 2009-21919 A | 1/2009 |
| JP | 2009-031682 A | 2/2009 |
| JP | 2009-273119 A | 11/2009 |
| JP | 2009-290268 A | 12/2009 |
| JP | 2009-303043 A | 12/2009 |
| JP | 2010-080648 A | 4/2010 |
| WO | 2007/044725 A2 | 4/2007 |
| WO | 2009/154713 A1 | 12/2009 |

OTHER PUBLICATIONS

International Search Report for corresponding International Application No. PCT/JP2011/007353 mailed Feb. 14, 2012.

International Preliminary Report on Patentability for corresponding International Application No. PCT/JP2011/007353 mailed Jul. 3, 2012.

Communication pursuant to Article 94(3) EPC for corresponding European Application No. 11860683.9 dated Oct. 28, 2014.

* cited by examiner

FIG.20
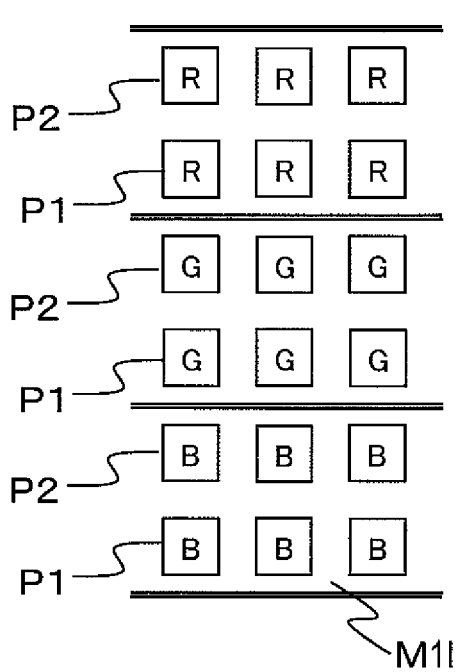
(a)
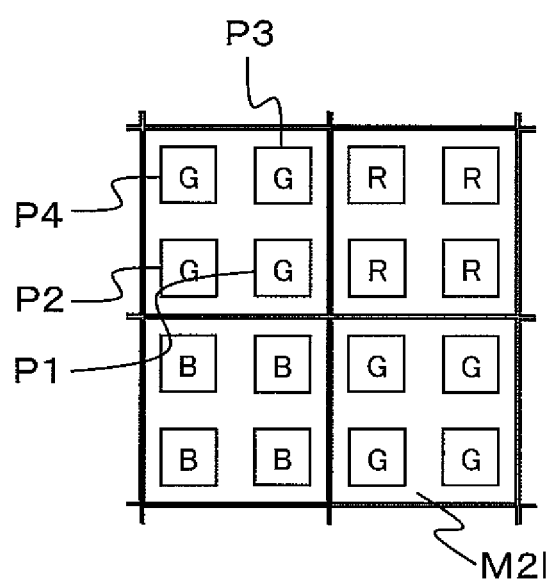
(b)

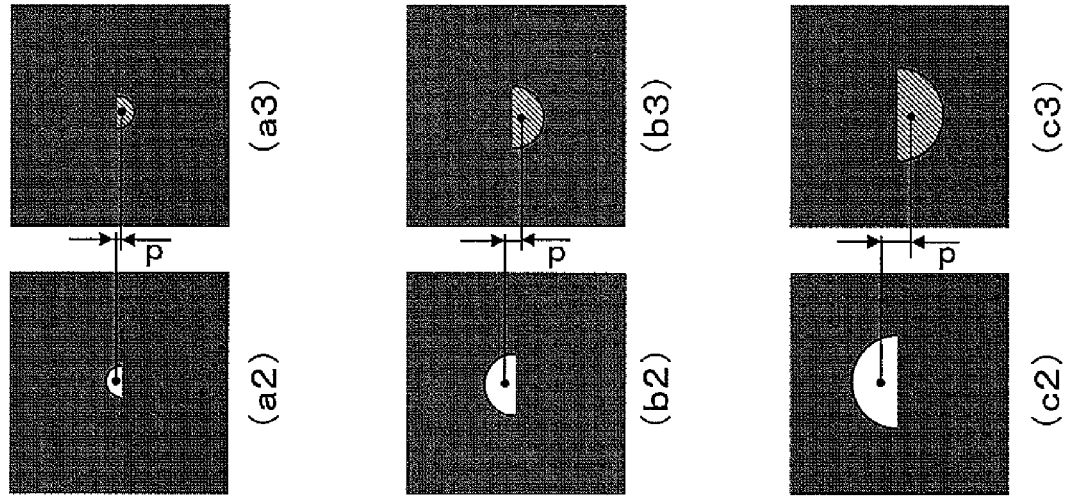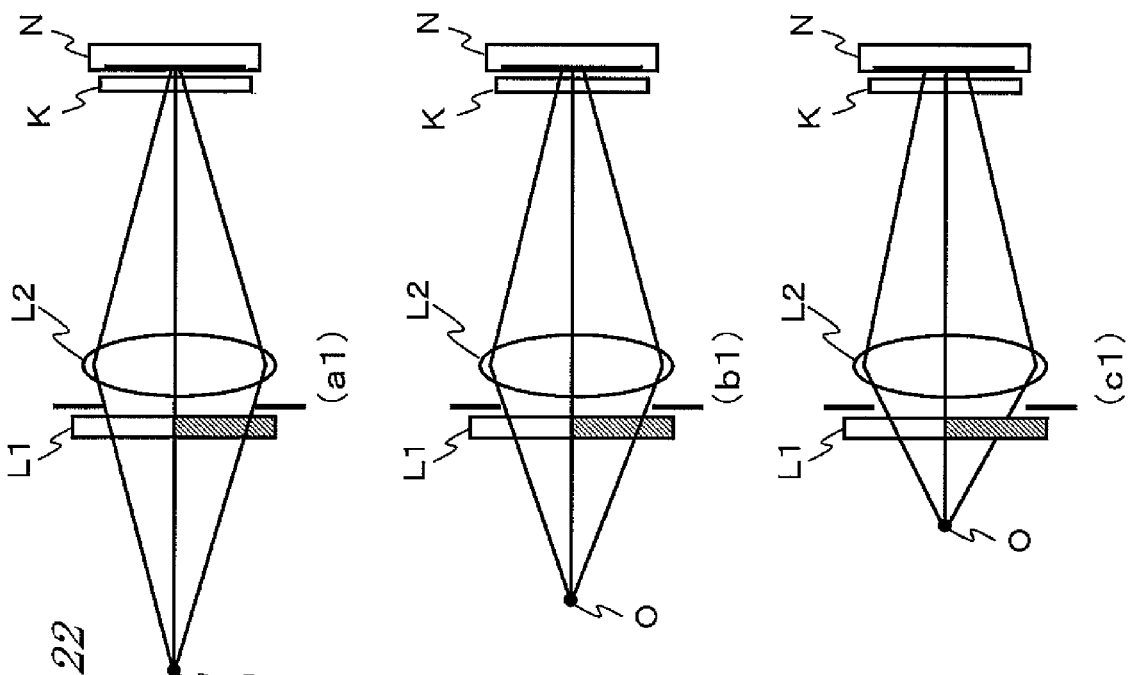
FIG. 22

FIG.23
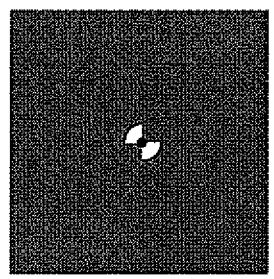
(a1)
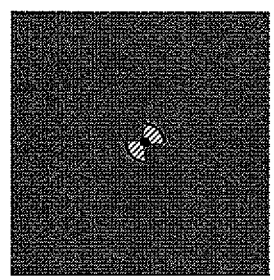
(a2)
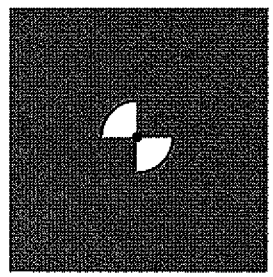
(b1)
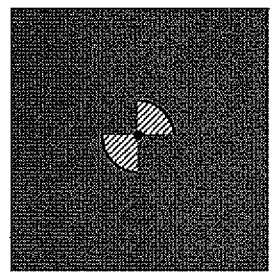
(b2)
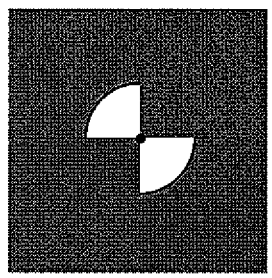
(c1)
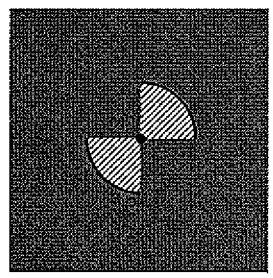
(c2)

FIG. 26
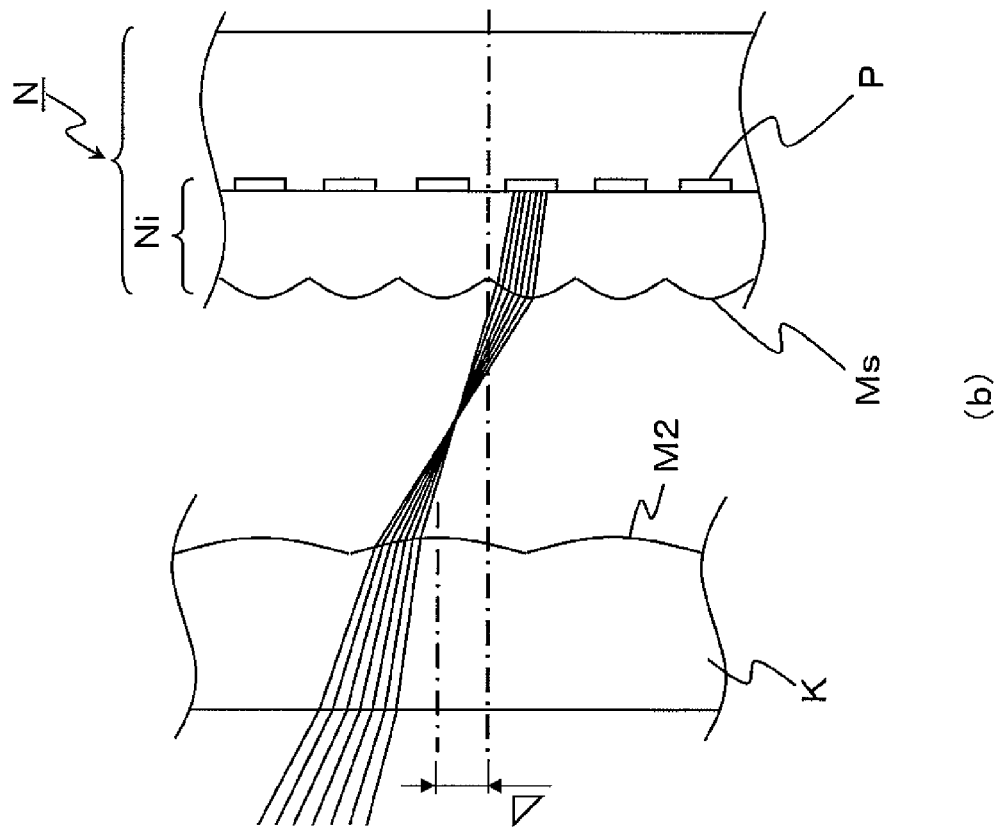
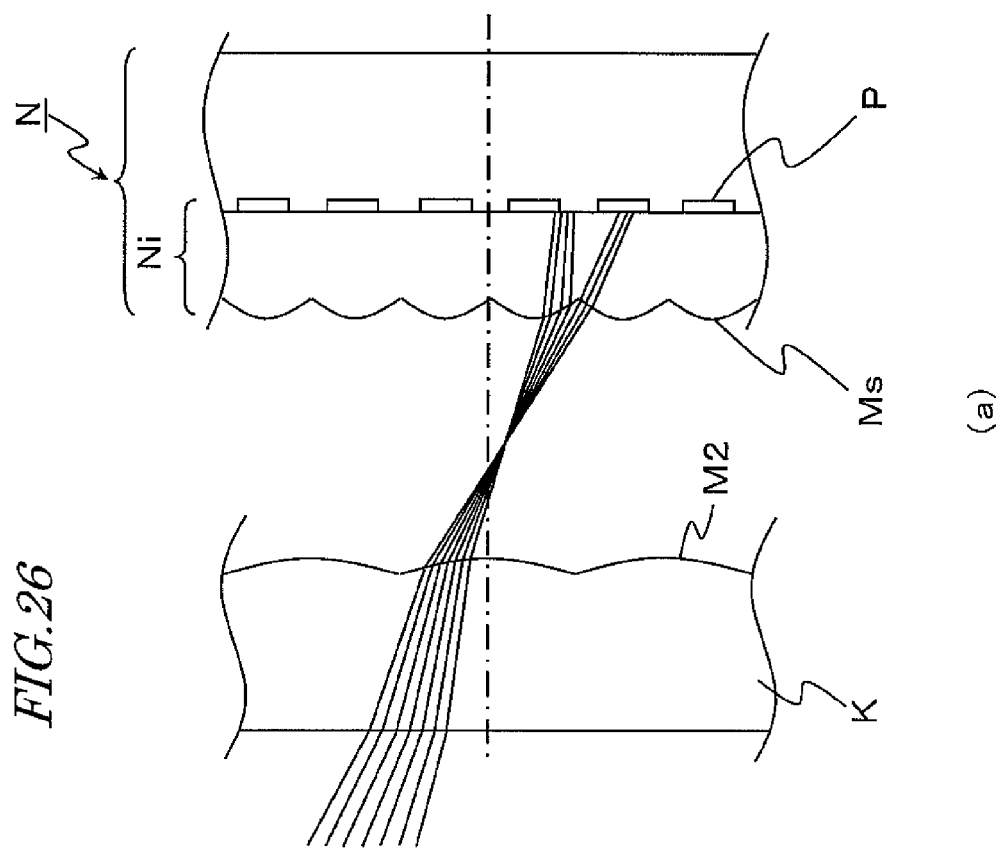

FIG.28
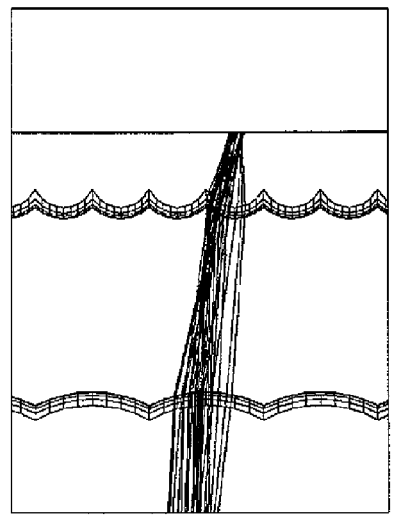
(b3)
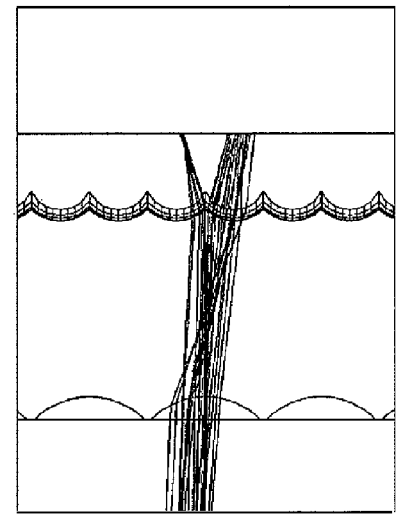
(a3)
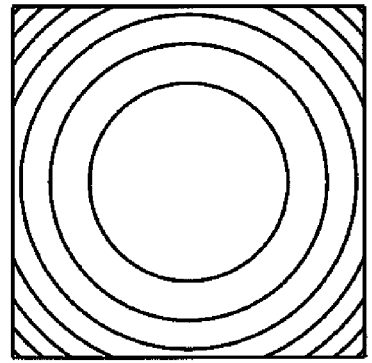
(b2)
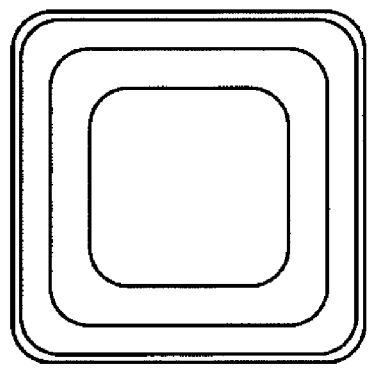
(a2)
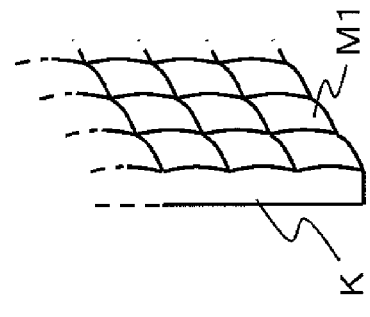
(b1)
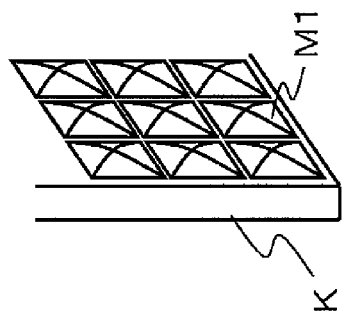
(a1)

IMAGE PICKUP DEVICE AND RANGEFINDER DEVICE

TECHNICAL FIELD

The present invention relates to an imaging apparatus, such as a camera, and a distance measuring apparatus.

BACKGROUND ART

As techniques of acquiring a high-dynamic range image, a method of providing an imaging device of a logarithmic transformation type, and a method of employing two imaging devices to perform shooting with different amounts of exposure, such that the two images are merged, are known. Also known is a method of acquiring images with different exposure times via time division, and merging them.

Patent Document 1 discloses a method where, in order to correct for pixel-to-pixel nonuniformity in sensitivity of an imaging apparatus of a logarithmic transformation type, imaging data pertaining to uniform light irradiation, which is stored in a memory, is subtracted from the imaging data of each pixel.

Patent Document 2 discloses a method of splitting the optical path with a prism, and performing imaging with two imaging devices under different shooting conditions (amounts of exposure).

The method of obtaining images with different exposure times via time division and merging them has a problem in that, since the subject is being shot via time division, image misalignments due to lapse of time may occur if the subject is moving, thus detracting from image continuity. Patent Document 3 discloses a technique of correcting for image misalignments in such an approach.

CITATION LIST

Patent Literature

[Patent Document 1] Japanese Laid-Open Patent Publication No. 5-30350
[Patent Document 2] Japanese Laid-Open Patent Publication No. 2009-31682
[Patent Document 3] Japanese Laid-Open Patent Publication No. 2002-101347

SUMMARY OF INVENTION

Technical Problem

However, the method of subjecting a detected light signal to logarithmic transformation requires a circuit for applying a logarithmic transformation to a pixel signal in each pixel, so that the pixel size cannot be reduced. Moreover, the method disclosed in Patent Document 1 requires a means in which to record correction data for correcting for the pixel-to-pixel nonuniformity in sensitivity, thus resulting in a cost increase.

The method of Patent Document 2 requires two imaging devices, so that the imaging apparatus will become large, thus resulting in a considerable cost increase.

Although Patent Document 3 discloses a technique of correcting for image misalignments, its principles make it difficult to completely correct for image misalignments due to lapse of time with respect to any and every moving body.

The present invention has been made in order to solve the above problems, and a main objective thereof is to provide an imaging apparatus and distance measuring apparatus which acquires a plurality of pieces of image information by using a single imaging device, and which is applicable to motion videos, such that high-dynamic range images are generated.

Solution to Problem

An imaging apparatus according to the present invention comprises: a lens optical system having a lens and a stop; an imaging device at least including a plurality of first pixels and a plurality of second pixels on which light passing through the lens optical system is incident; an array optical device disposed between the lens optical system and the imaging device; and a signal processing section for generating an image by using a plurality of pixel values obtained at the plurality of first pixels and a plurality of pixel values obtained at the plurality of second pixels, wherein, the lens optical system has a first region and a second region in the stop or in a plane perpendicular to an optical axis and near the stop; the array optical device causes light passing through the first region to enter the plurality of first pixels, and causes light passing through the second region to enter the plurality of second pixels; and a proportion of an amount of light exiting the second region relative to an amount of light entering the second region is smaller than a proportion of an amount of light exiting the first region relative to an amount of light entering the first region.

Advantageous Effects of Invention

According to the present invention, it is ensured that the amount of light (amount of exposure) supplied to the second pixels is smaller than the amount of light (amount of exposure) supplied to the first pixels. As a result, even when more than a detectable amount of light is supplied to the first pixels (i.e., the pixel values of the first pixels are saturated), an accurate brightness of the subject can be calculated by using the values which are detected at the second pixels. On the other hand, when light within a detectable range by the first pixels is supplied to the first pixels (i.e., the pixel values of the first pixels are not saturated), the values which are detected by the first pixels can be used. As a result, a high-dynamic range image can be obtained by using a single imaging system. The present invention does not require use of any special imaging device e.g., that of a logarithmic transformation type, and does not require a plurality of imaging devices.

BRIEF DESCRIPTION OF DRAWINGS

FIGS. 20(a) and (b) are diagrams showing relative positioning of an array optical device K and pixels of an imaging device N according to Embodiment 6 of the present invention.

FIGS. 22(a1), (b1), and (c1) are ray diagrams for different subject distances. (a2), (b2), and (c2) are diagrams schematically showing image information of a point image which is obtained as light from an object point O passing through an optical region D1 reaches pixels of odd columns via lenticular elements. (a3), (b3), and (c3) show image information which is obtained as light from an object point O passing through an optical region D2 reaches pixels of even columns via lenticular elements.

FIG. 23(a1), (b1), and (c1) are diagrams schematically showing image information of a point image which is obtained by adding the pixel values of pixels of odd rows and odd columns and pixels of even rows and even columns. (a2), (b2), and (c3) are diagrams schematically showing image information of a point image which is obtained by adding the pixel values of pixels of even rows and odd columns and pixels of odd rows and even columns.

FIG. 26(a) is a diagram showing enlarged the neighborhood of an imaging plane in the case where crosstalk occurs in an embodiment of the present invention; and (b) is a diagram showing enlarged the neighborhood of the imaging plane in the case where crosstalk is reduced.

FIG. 28(a1) is a perspective view showing a microlens array having a shape which is rotation-asymmetric with respect to the optical axis. (a2) is a diagram showing contours of the microlens array shown in (a1). (a3) is a diagram showing ray tracing simulation results where the microlenses shown in (a1) and (a2) are applied to an array optical device according to the present invention. (b1) is a perspective view showing a microlens array having a shape which is rotation-symmetric with respect to the optical axis. (b2) is a diagram showing contours of the microlens array shown in (b1). (b3) is a diagram showing ray tracing simulation results where the microlenses shown in (b1) and (b2) are applied to an array optical device according to the present invention.

DESCRIPTION OF EMBODIMENTS

Hereinafter, embodiments of the imaging apparatus according to the present invention will be described with reference to the drawings.

Embodiment 1

Figure 1:
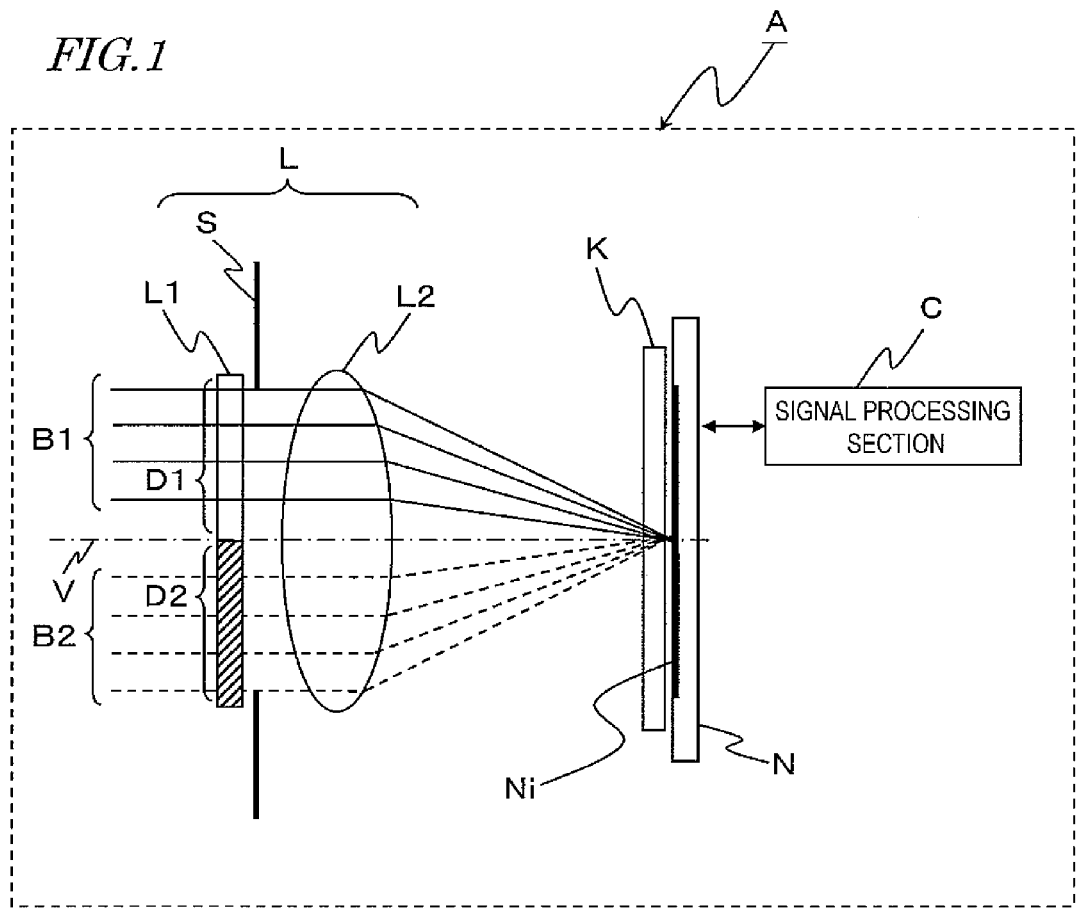
FIG. 1 A schematic diagram showing Embodiment 1 of an imaging apparatus A according to the present invention.

FIG. 1 is a schematic diagram showing an imaging apparatus A according to Embodiment 1. The imaging apparatus A of the present embodiment includes: a lens optical system L with an optical axis V; an array optical device K located near a focal point of the lens optical system L; an imaging device N; and a signal processing section C.

The lens optical system L includes: an optical device L1 on which light beams B1 and B2 from a subject (not shown) are incident; a stop (diaphragm) S on which light passing through the optical device L1 is incident; and a lens L2 on which light passing through the stop S is incident.

The array optical device K is located near a focal point of the lens optical system L, and is located at a position which is a predetermined distance away from the imaging plane Ni.

In FIG. 1, the light beam B1 is a light beam that passes through an optical region D1 of the optical device L1, whereas the light beam B2 is a light beam that passes through an optical region D2 of the optical device L1. The light beams B1 and B2 pass through the optical device L1, the stop S, the lens L2, and the array optical device K in this order, and reach the imaging plane Ni of the imaging device N (shown in FIG. 4 and the like).

Figure 2:
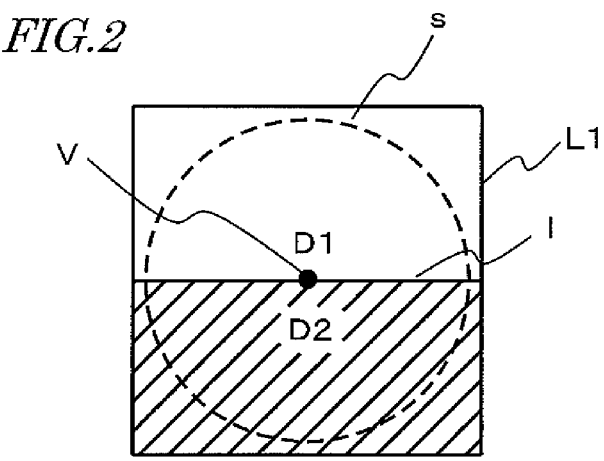
FIG. 2 A front view showing an optical device L1 according to Embodiment 1 of the present invention from the subject side.

FIG. 2 is a front view of the optical device L1 from the subject side. As shown in FIG. 2, in a plane which is perpendicular to the optical axis near the stop, the optical device L1 of the lens optical system L includes the two optical regions D1 and D2 having mutually different transmittances. Since the transmittances of the optical regions D1 and D2 are different from each other, the proportion of the amount of light exiting the optical region D2 relative to the amount of light entering the optical region D2 is smaller than the proportion of the amount of light exiting the optical region D1 relative to the amount of light entering the optical region D1.

The optical regions D1 and D2 are two upper and lower regions obtained by dividing a plane which is perpendicular to the optical axis V of the lens optical system L with a line 1 which intersects the optical axis V of the lens optical system L. In principle, the optical regions D1 and D2 have an equal area. However, the optical regions D1 and D2 may have different areas.

In FIG. 2, a broken line s shows where the stop S is.

Figure 3:
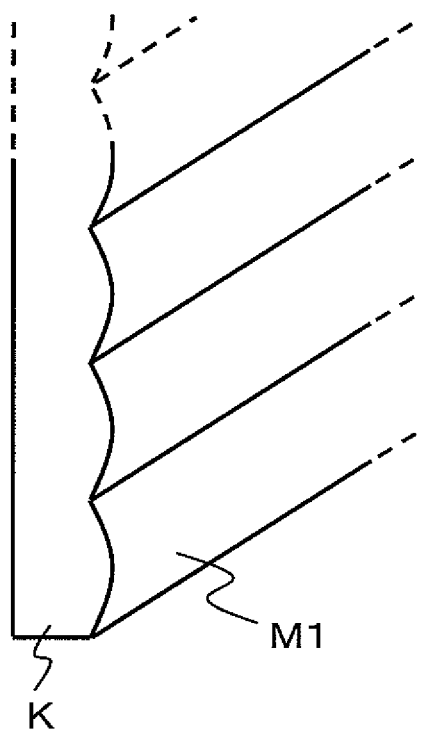
FIG. 3 A perspective view of an array optical device K according to Embodiment 1 of the present invention.

FIG. 3 is a perspective view of the array optical device K. On a face of the array optical device K that is closer to the imaging device N, a plurality of optical elements M1 which are elongated along the lateral direction are disposed in the vertical direction. The cross section (vertical direction) of each optical element M1 has the shape of a curved surface protruding toward the imaging device N. Thus, the array optical device K has a lenticular lens construction. The array optical device K is disposed so that its face having the optical elements M1 formed thereon faces toward the imaging plane Ni.

The array optical device K is designed so that a large part of the light beam B1 (the light beam B1 indicated by solid lines in FIG. 1) passing through the optical region D1 (shown in FIG. 1 and FIG. 2) of the optical device L1 reaches each of a plurality of pixels P1 (shown in FIG. 4) on the imaging plane Ni, and that a large part of the light beam (the light beam B2 indicated by broken lines in FIG. 1) passing through the optical region D2 reaches each of a plurality of pixels P2 (shown in FIG. 4) on the imaging plane Ni. Parameters such as refractive index of the array optical device K, the distance from the imaging plane Ni, and the radius of curvature of the surface of each optical element M1 are to be set to appropriate values.

FIG. 4(a) is a diagram showing enlarged the array optical device K and imaging device N shown in FIG. 1, whereas FIG. 4(b) is a diagram showing relative positioning of the array optical device K and pixels on the imaging device N.

On the imaging plane Ni, the pixels P are disposed in a matrix shape. The pixels P are classified into pixels P1 (P1A, P1B, ...) and pixels P2 (P2A, P2B, ...). As mentioned above, the pixels P1 are pixels on which a large part of the light passing through the optical region D1 is incident, whereas the pixels P2 are pixels on which a large part of the light passing through the optical region D2 are incident. The pixels P1 and the pixels P2 alternate along the vertical direction (column direction).

On the imaging plane Ni, a plurality of unit regions M1I are disposed along the vertical direction (column direction). Two rows of pixels, i.e., one row of pixels P1 and one row of pixels P2, are disposed in each unit region M1I. One unit region M1I on the imaging plane Ni corresponds to one optical element M1 of the array optical device K. On the imaging plane Ni of the imaging device N, microlenses Ms are provided so as to cover the surface of the pixels P1 and P2.

In the unit region M1I, light from the same portion of a subject is incident on upper and lower pixels (e.g., a pixel P1A and a pixel P2A). In the present embodiment, the optical regions D1 and D2 have different transmittances, and thus the ratio between the amounts of light entering the pixels P1A and P2A is substantially equal to the ratio between the transmittances of the optical regions D1 and D2. However, when crosstalk occurs, there may be some discrepancy the ratio between the transmittances of the optical regions D1 and D2 and the ratio of amounts of light entering the pixels P1A and P2A.

Based on pixel values (e.g., gray scale values) obtained at the plurality of pixels P1 and pixel values obtained at the plurality of pixels P2, the signal processing section C shown in FIG. 1 generates an image.

Since the transmittance of the optical region D2 is smaller than the transmittance of the optical region D1, the amount of exposure of the pixels P2 is smaller than the amount of exposure of the pixels P1. As a result, even when more than a detectable amount of light is supplied to the pixels P1 (i.e., the pixel values of the pixels P1 are saturated), it is possible to calculate an accurate brightness of the subject by using values which are detected at the pixels P2. On the other hand, when light within a detectable range by the pixels P1 is supplied to the pixels P1 (i.e., the pixel values of the pixels P1 are not saturated), the values which are detected by the pixels P1 can be used. The specific processing for the obtained pixel values will be described in detail later.

Figure 4:
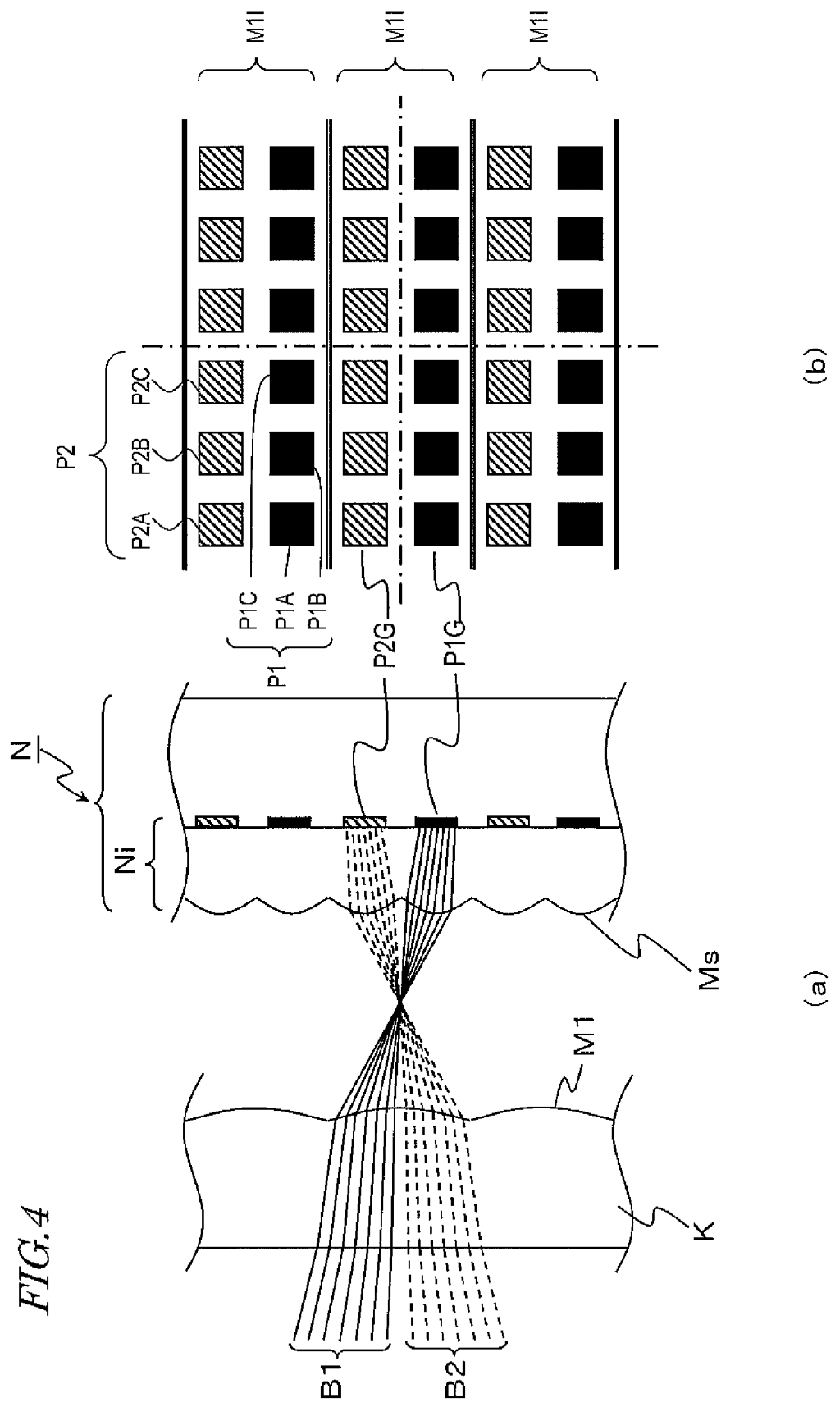
FIG. 4($a$) is a diagram showing enlarged the array optical device K and an imaging device N shown in FIG. 1 according to the present Embodiment 1; and ($b$) is a diagram showing relative positioning of the array optical device K and pixels of the imaging device N.
Figure 5:
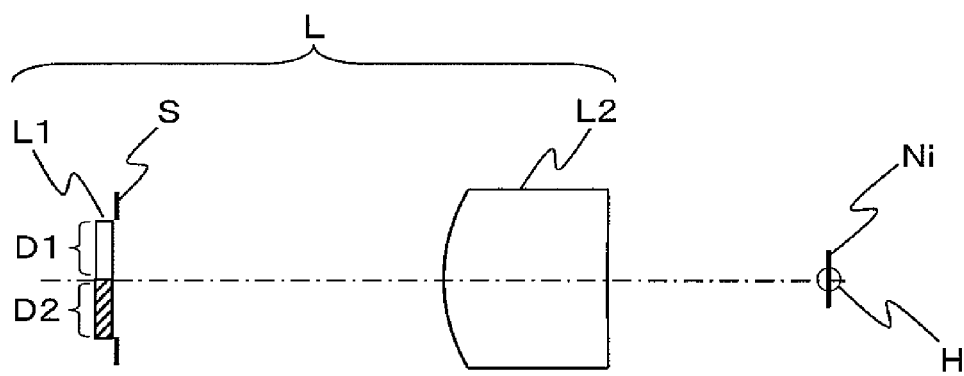
FIG. 5 A cross-sectional view showing the imaging apparatus A according to Embodiment 1 of the present invention.

FIG. 5 is a cross-sectional view of the imaging apparatus A according to Embodiment 1. In FIG. 5, constituent elements identical to those in FIG. 1 are denoted by the same numerals as those in FIG. 1. Although the array optical device K (shown in FIG. 1 and the like) is omitted from illustration in FIG. 5, the array optical device K is actually included in a region H in FIG. 5. The region H has a construction as shown in FIG. 4(a).

Table 1 and Table 2 show design data for the optical system L of the imaging apparatus A shown in FIG. 5. In Table 1 and Table 2, Ri represents a paraxial radius of curvature (mm) of each surface; di represents an inter-surface-center interval (mm) of each surface; nd represents a d-line refractive index of the lens or filter; and ν d represents a d-line Abbe number of each optical device. Moreover, regarding the surface numbers in Table 1 and Table 2, an R1 surface and an R2 surface are respectively the object-side face and the image-side face of the optical device L1 in FIG. 5; and an R3 surface and an R4 surface are respectively the object-side face and the image-side face of the lens L2 in FIG. 5. Moreover, an aspherical shape is expressed by (math. 1), where x is a distance from a tangent plane of the surface vertex in the optical axis direction; h is a height from the optical axis; r is a paraxial radius of curvature; k is a conical constant; and $A_m$ (m=4, 6, 8, 10) is an $m^{th}$ aspheric coefficient.

$$x = \frac{\frac{1}{r}h^2}{1 + \sqrt{1 - (1+k)\left(\frac{1}{r}\right)^2 h^2}} + A_4 h^4 + A_6 h^6 + A_8 h^8 + A_{10} h^{10}$$ [math. 1]

TABLE 1

*LENS DATA
FOCAL LENGTH = 10 mm, F VALUE = 2.8, WAVELENGTH 550 nm
ANGLE OF VIEW 2ω = 10°,
EFFECTIVE IMAGING CIRCLE DIAMETER = φ 1.75 mm

| SURFACE # | Ri | di | nd | υd |
|---|---|---|---|---|
| OBJECT | ∞ | 4000 | — | — |
| R1 SURFACE | ∞ | 0.5 | 1.5168 | 64.2 |
| R2 SURFACE | ∞ | 0.1 | — | — |
| STOP | ∞ | 10 | — | — |
| R3 SURFACE | 5.332237 | 5 | 1.5253 | 56.0 |
| R4 SURFACE | −319.8501 | 6.75 | — | — |
| IMAGE SURFACE | ∞ | — | — | — |

TABLE 2

| | *ASPHERIC COEFFICIENT | | | | |
| --- | --- | --- | --- | --- | --- |
| | k | A4 | A6 | A8 | A10 |
| R3 SUR-FACE | −0.2969869 | 0.000421138 | −0.000059237 | 0.000016321 | −0.000001294 |
| R4 SUR-FACE | 0 | 0.00274336 | −0.000566209 | 0.000216386 | −0.000026416 |

In this design example, within the subject-side face of the optical device L1, the optical region D1 has a transmittance of 92%, and the optical region D2 has a transmittance of 23%. In other words, the ratio between the transmittances of the optical regions D1 and D2 is 4:1. In order to realize such a transmittance construction, the optical device L1 may be a glass plate, and a dielectric multilayer film having a transmittance of 23% may be formed only in its region corresponding to D2, for example. As the dielectric multilayer film, a multilayer film made of $SiO_2$, $TiO_2$, and the like may be used, for example.

Figure 6:
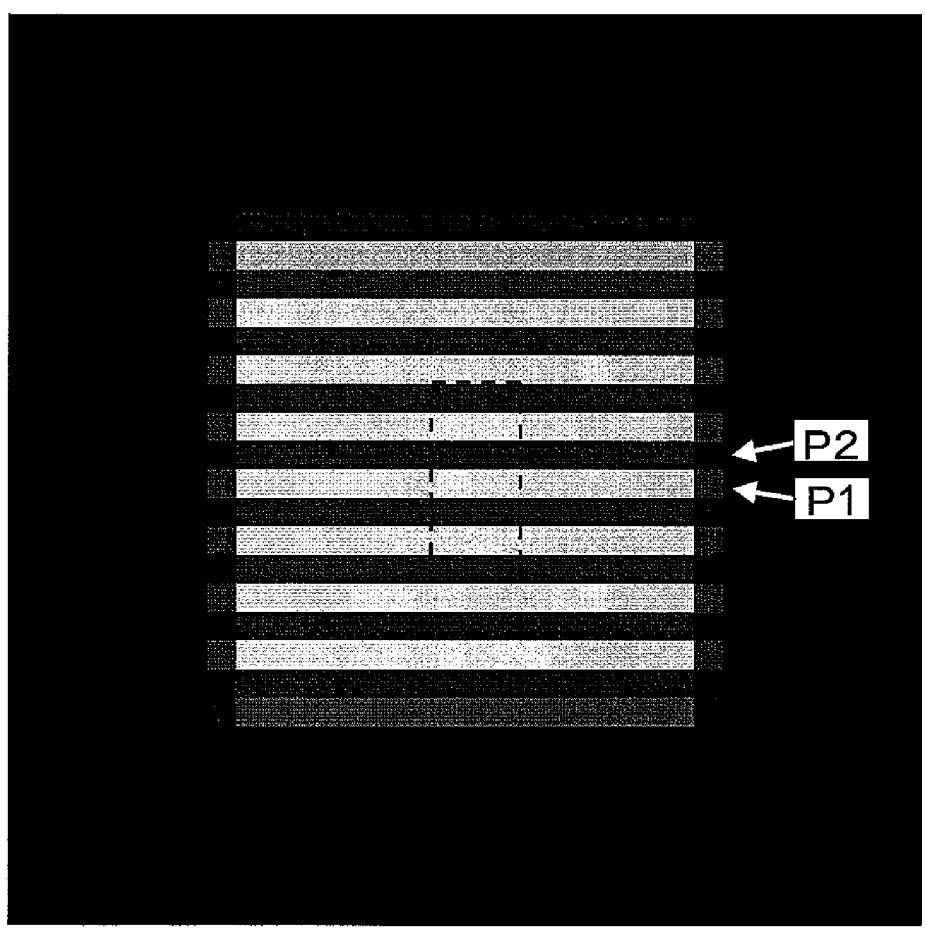
FIG. 6 A diagram showing a captured image according to Embodiment 1 of the present invention.

FIG. 6 shows a captured image to be obtained by the imaging device N when a 4 mm×4 mm square pattern is placed at a position which is at a subject distance of 4 m. The captured image of FIG. 6 is derived through a simulation, where the pixel pitch on the imaging device N shown in FIG. 4 is set to 6 μm and the pitch of the optical elements M1 of the array optical device K is set to 12 μm. In the captured image of FIG. 6, an alternating bright-dark pattern appears owing to the actions of the optical device L1 and the array optical device K. In FIG. 6, the image which is formed by the pixels P1 is bright because it is formed by a light beam passing through the high-transmittance optical region D1 of the optical device L1, whereas the image which is formed by the pixels P2 is dark because it is formed by a light beam passing through the low-transmittance optical region D2 of the optical device L1. In a broken lined frame at the center of FIG. 6, a ratio between a 9-point average value of the pixel values of the pixels P1 and a 9-point average value of the pixel values of the pixels P2 can be determined from the image to be 3.98:1, this being substantially equal to the ratio between the transmittances of the optical regions D1 and D2.

Next, a method of generating an image with a high dynamic range from the pixel values of the pixels P1 and P2 will be described.

Figure 7:
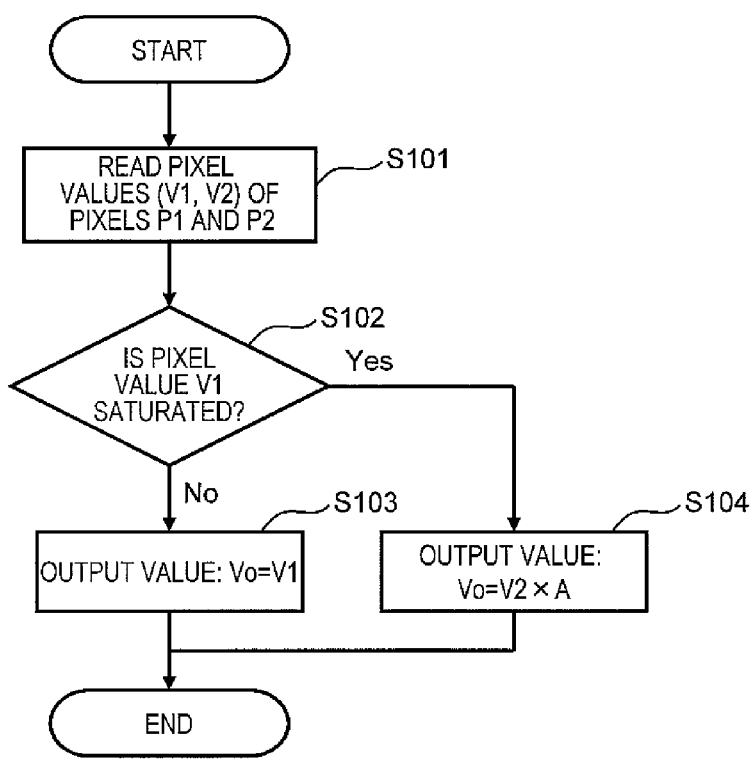
FIG. 7 A flowchart for generating an image with a high dynamic range according to Embodiment 1 of the present invention.

FIG. 7 is a flowchart showing steps for generating an image with a high dynamic range from the pixel value of a pixel P1 and the pixel value of a pixel P2. This process is executed by the signal processing section C in FIG. 1. It is assumed that the pixel values of the pixels P1 and the pixels P2 are 8 bits (256 gray scale levels).

First, at step S101, a pixel value which is obtained at one of the pixels P1 (e.g., a pixel P1A) and a pixel value which is obtained at one of the pixels P2 (e.g., a pixel P2A) are both read from the imaging device. It is assumed that the pixel values of the pixel P1 and the pixel P2 are V1 and V2, respectively. As described above, light passing through the optical region D1 enters the pixel P1, whereas light passing through the optical region D2 enters the pixel P2. When the light transmittance of the optical region D2 is ¼ of the light transmittance of the optical region D1, about four times as large an amount of light as the pixel P2 enters the pixel P1. Therefore, the pixel value V1 of the pixel P1 is about four times the pixel value V2 of the pixel P2.

Next, at step S102, it is determined whether the pixel value V1 of the pixel P1A is saturated or not. Since the amount of information of each pixel is 8 bits, a pixel value of 255 is to be determined as saturated, and any pixel value that is less than 255 is to be determined as not saturated.

If step S102 finds that the pixel value V1 of the pixel P1A is not saturated, the pixel value V1 is output as an output value Vo at step S103.

On the other hand, if step S102 finds that the pixel value V1 of the pixel P1A is saturated, at step S104, a value which is obtained by multiplying the pixel value V2 by the ratio A between the transmittances of the optical regions D1 and D2 of the optical device L1 (A=4 in the present embodiment) becomes the output value Vo. As a result, even when more than an amount of light which will saturate the pixel value V1 enters the pixel P1A, for example, a pixel value corresponding to that amount of light can be calculated by using the pixel value V2. As the above calculation is conducted for every one of the pixels P1 and P2, it becomes possible to generate image information with a broad dynamic range by only conducting (e.g. a single instance of) imaging by using a single imaging optical system.

In the present embodiment, since the transmittance ratio A is 4, the information value of the image which is output at step S104 will be 10 bits. In order to allow the generated 10-bit image to be displayed on an 8-bit display, for example, it is necessary to compress its dynamic range. If compression is performed by proportionally compressing the pixel values, the image information in dark portions will be lost. Therefore, the dynamic range is desirably compressed while conserving the gray scale characteristic of the dark portions, by using logarithmic transformation, table conversion, or the like.

After the image synthesis process of FIG. 6, pixel values will be missing in every other pixel along the y direction; therefore, the pixel value of any missing pixel may be generated through complementation using the pixel values of adjoining pixels along the y direction. Specifically, if a pixel value at coordinates (x, y+1) is missing from the image, a pixel value at coordinates (x, y) and a pixel value at coordinates (x, y+2) may be averaged to complement the pixel value at coordinates (x, y+1). Alternatively, pixel values along the x direction may be added or arithmetic meaned for every two pixels to generate a respective image.

Moreover, although the ratio in transmittance between the optical region D1 and the optical region D2 is 4:1 in the present Embodiment 1, the transmittance ratio is not limited thereto, but may be freely designed. As a result, the dynamic range can be freely set.

In the present embodiment, it is preferable the optical device L1 is provided near the stop S. In FIG. 1, it is provided at a position such that light passing through the optical device L1 directly (i.e., not via any other optical member) enters the stop S. The optical device L1 may be disposed on the imaging device N side of the stop S. In this case, preferably, the optical device L1 is provided between the stop S and the lens L2, such that light passing through the stop S directly (i.e., not via any other optical member) enters the optical device L1. In the case of an image-side telecentric optical system, the incident angle of a ray at a focal point of the optical system is unequivocally determined by the position of the ray passing through the stop S. Moreover, the array optical device K has a function of branching out into outgoing directions depending on the incident angle of the ray. Therefore, by providing the optical device L1 near the stop S and providing the array optical device K near the focal point of the optical system, light passing through the respective optical regions D1 and D2 is allowed to enter different pixels.

Moreover, in the present embodiment, instead of providing the optical device L1, an optical region may be provided on the face of the lens L2 that is closer to the stop. In this case, a film for introducing a different transmittance may be provided on the R3 surface of the lens L2. In the case where the lens L2 is a thin lens, the transmittance of the lens L2 itself may be differentiated, instead of providing the optical device L1.

Figure 8:
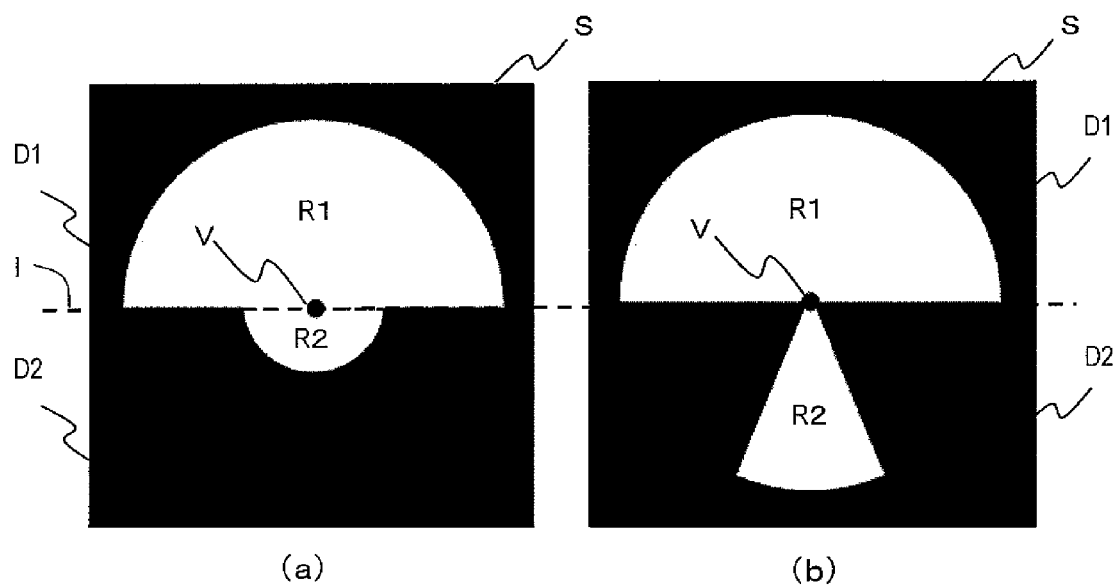
FIGS. 8(a) and (b) are front views showing a stop S according to Embodiment 1 of the present invention from the subject side.

In the present Embodiment 1, the transmittances of the optical regions D1 and D2 are made mutually different. However, the opening area (aperture ratio) of the stop S may be differentiated as shown in FIG. 8(a) or (b). In this case, the optical device L1 is not necessary.

In FIGS. 8(a) and (b), V represents the optical axis of the lens optical system L. In both of FIGS. 8(a) and (b), the optical regions D1 and D2 are regions obtained by dividing a plane which is perpendicular to the optical axis V of the lens optical system L with a line 1 which intersects the optical axis V. Openings R1 and R2 are provided respectively in the optical regions D1 and D2, the opening R2 being smaller than the opening R1. For example, in order to ensure that the amount of light which is supplied to the pixels P2 is ¼ of the amount of light which is supplied to the pixels P1, the area of the opening R2 may be made ¼ of the area of the opening R1.

In FIG. 8(a), the openings R1 and R2 are both semicircles, the radius of the opening R2 being made smaller than the radius of the opening R1. In FIG. 8(b), the openings R1 and R2 are sectors of a circle of the same radius, and by making the angle of the central angle of the opening R2 smaller than the angle of the central angle of the opening R1, the areas of the openings of the optical regions D1 and D2 are adjusted. With such a construction, too, the amount of light reaching the pixels P1 and the pixels P2 can be differentiated, as in the case of differentiating the transmittances; therefore, an image with a high dynamic range can be generated from pixel values of the pixels P1 and pixel values of the pixels P2. Note that the openings are not limited to the shapes shown in FIGS. 8(a) and (b). For example, circular or elliptical openings, or rectangular openings of mutually different areas may be provided, one for each, in the optical regions D1 and D2.

Moreover, the optical system of the imaging apparatus as indicated in Table 1 and Table 2 is an image-side telecentric optical system. As a result of this, even if the angle of view changes, the principal ray enters the array optical device K at an incident angle with a value which is closer to 0 degrees, so that crosstalk between the light beam reaching the pixel P1 and the light beam reaching the pixel P2 can be reduced across the entire imaging region.

Embodiment 2

The present Embodiment 2 differs from Embodiment 1 in that the optical device L1 is divided into four regions, and that the array optical device is changed from lenticular elements to microlenses. Herein, any detailed description directed to similar substance to that of Embodiment 1 will be omitted.

Figure 9:
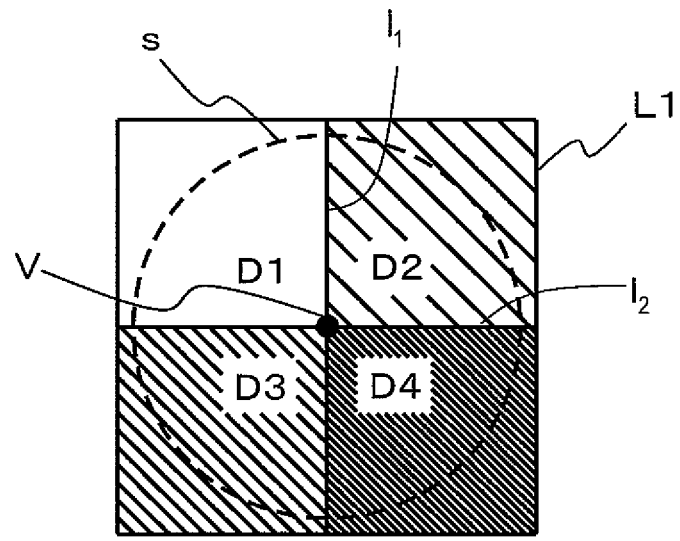
FIG. 9 A front view showing an optical device L1 according to Embodiment 2 of the present invention from the subject side.

FIG. 9 is a front view of the optical device L1 from the subject side. The optical regions D1, D2, D3, and D4 are four regions obtained by dividing a plane which is perpendicular to the optical axis V with lines 11 and 12 which intersect the optical axis V. The line 11 and line 12 perpendicularly intersect each other in the plane which is perpendicular to the optical axis V. In principle, the optical regions D1, D2, D3, and D4 have an equal area. However, the optical regions D1, D2, D3, and D4 may have different areas.

Moreover, the optical regions D1, D2, D3, and D4 have light transmittances of 92%, 23%, 5.75%, and 1.44%, respectively. In other words, the ratio of transmittances of the optical regions D1, D2, D3, and D4 is 64:16:4:1. Moreover, a broken line s shows where the stop S is.

Figure 10:
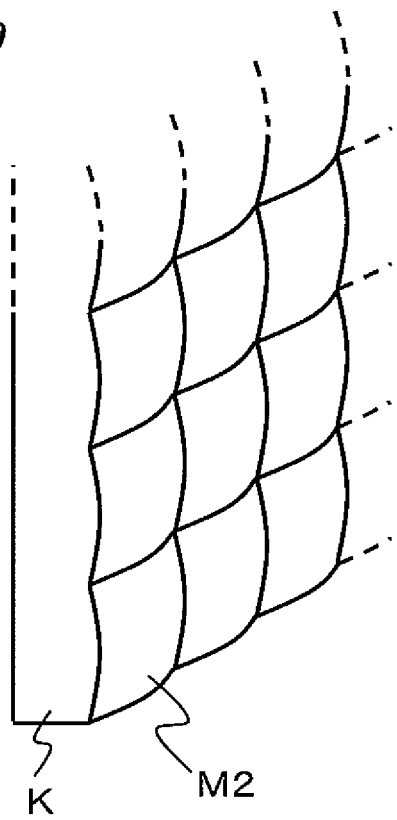
FIG. 10 A perspective view of an array optical device K according to Embodiment 2 of the present invention.

FIG. 10 is a perspective view of the array optical device K. On a face of the array optical device K that is closer to the imaging device N, optical elements M2 are disposed in a lattice form. Each optical element M2 has curved-surface cross sections (cross sections respectively along the vertical direction and the lateral direction), each optical element M2 protruding toward the imaging device N. Thus, the optical elements M2 are microlenses, and the array optical device K is a microlens array.

FIG. 11(a) is a diagram showing enlarged the array optical device K and the imaging device N, whereas FIG. 11(b) is a diagram showing relative positioning of the array optical device K and pixels on the imaging device N. As in Embodiment 1, the array optical device K is located near a focal point of the lens optical system L, and is located at a position which is a predetermined distance away from the imaging plane Ni. Moreover, the array optical device K is disposed so that its face having the optical elements M2 formed thereon faces toward the imaging plane Ni.

On the imaging plane Ni, the pixels P are disposed in a matrix shape. The pixels P are classified into pixels P1, P2, P3, and P4. The pixels P1, P2, P3, and P4 are pixels on which a large part of the light passing through the optical regions D1, D2, D3, and D4 is incident, respectively. In FIG. 11(b), pixels P1A, P1B, . . . are classified as pixels P1; pixels P2A, P2B, . . . are classified as pixels P2; pixels P3A, P3B, . . . are classified as pixels P3; and pixels P4A, P4B, . . . are classified as pixels P4.

On the imaging plane Ni, a plurality of unit regions M2I are disposed along the vertical direction (column direction) and the lateral direction. Four pixels, i.e., two rows and two columns of pixels P1 to P4, are disposed in each unit region M2I. One unit region M2I on the imaging plane Ni corresponds to one optical element M2 of the array optical device K. On the imaging plane Ni, microlenses Ms are provided so as to cover the surface of the pixels P1, P2, P3, and P4.

Those pixels which are disposed within the unit region M2I (e.g., pixels P1A, P2A, P3A, P4A) are struck by light from the same portion of a subject.

Figure 11:
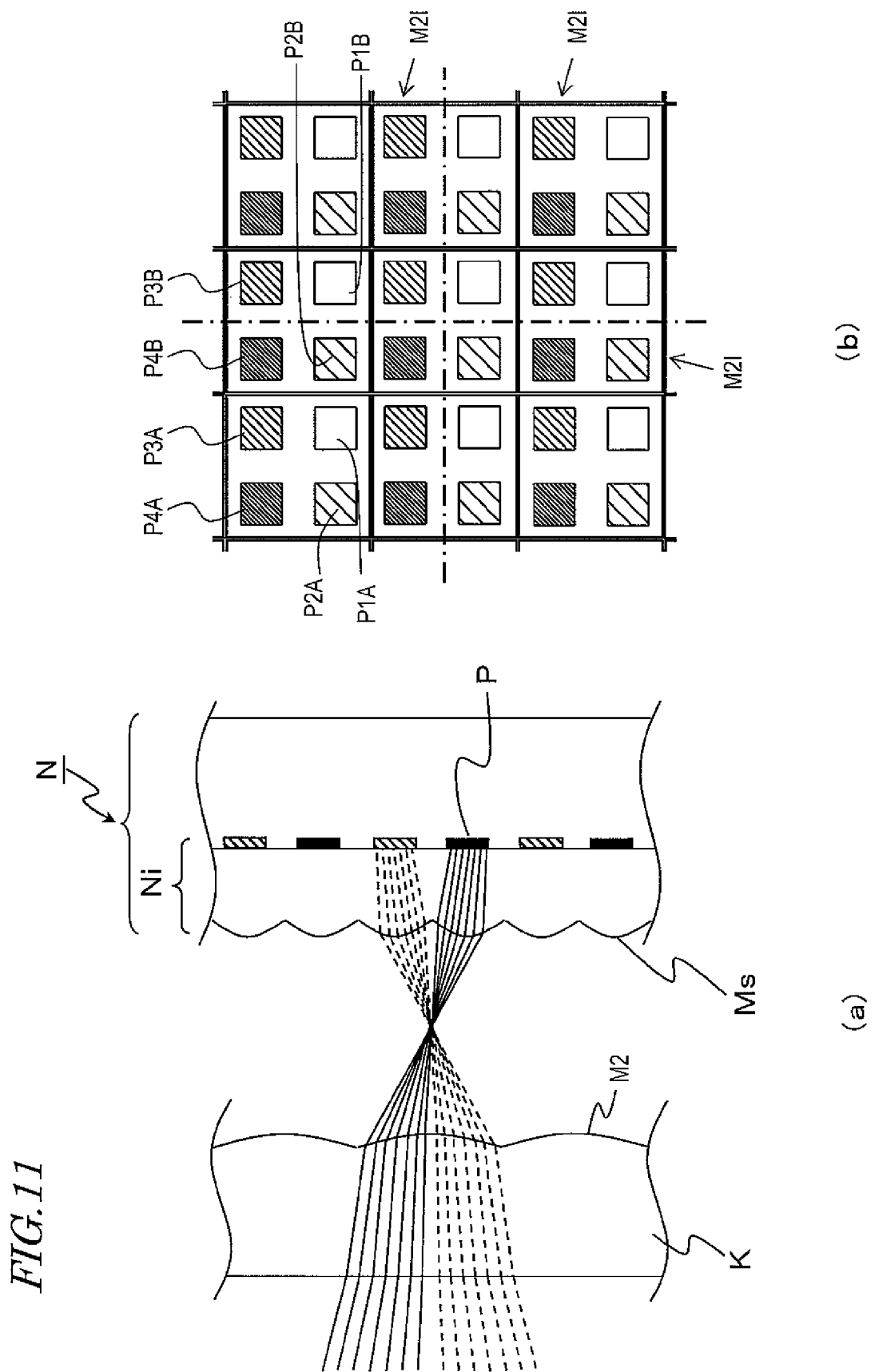
FIG. 11(a) is a diagram showing enlarged the array optical device K and an imaging device N shown in FIG. 1 according to the present Embodiment 2; and (b) is a diagram showing relative positioning of the array optical device K and pixels of the imaging device N.
Figure 12:
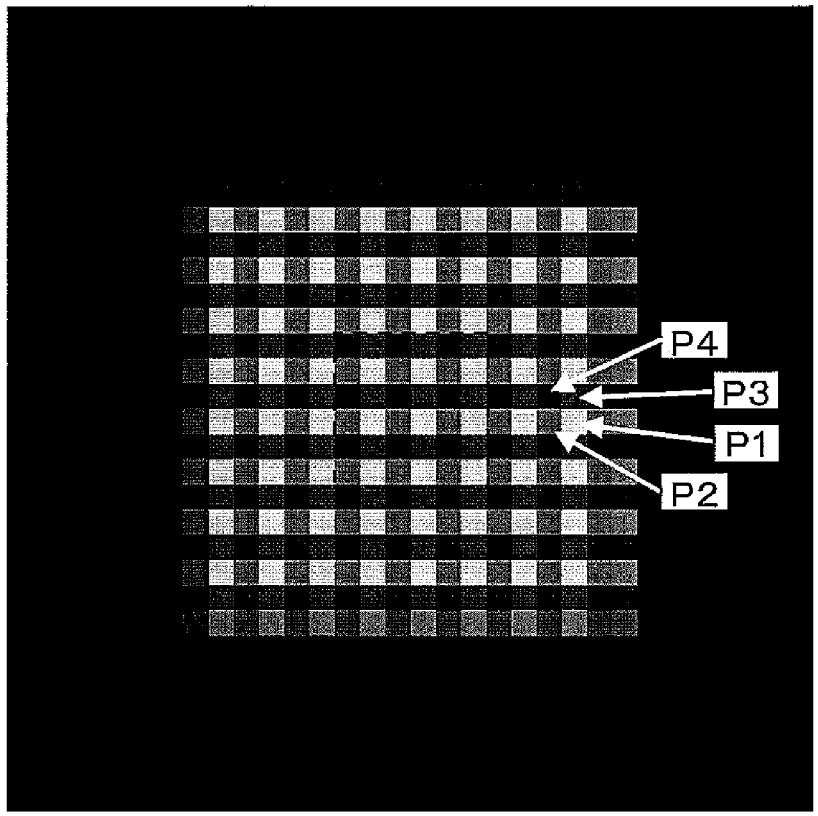
FIG. 12 A diagram showing a captured image according to Embodiment 2 of the present invention.

FIG. 12 shows a captured image to be obtained when a 4 mm×4 mm square pattern is placed at a position which is at a subject distance of 4 m. The captured image shown in FIG. 12 is derived through a simulation, where the pixel pitch on the imaging device N shown in FIG. 11 is set to 6 μm and the pitch of the optical elements M2 of the array optical device K is set to 12 μm. In the captured image of FIG. 12, a four-fold bright-dark pattern (the image of FIG. 12 is subjected to γ correction so that the bright-dark pattern is easier to see) appears owing to the actions of the optical device L1 and the array optical device K. In a broken lined frame at the center of FIG. 12, a 9-point pixel value average of the ratio between the pixel P1, pixel P2, pixel P3, and pixel P4 is determined from the image to be 47.54:12.47:3.76:1. This pixel value ratio is deviated from the aforementioned transmittance ratio. This is because crosstalk exists between adjoining pixels. For example, while a large part of the light beam passing through the optical region D1 reaches the pixels P1, a portion thereof reaches the pixels P2, P3, and P4. Similarly, as for the light beam passing through any other region, a portion thereof reaches pixels adjoining the pixel to be reached, thus causing crosstalk. Thus, the ratio of the pixel values will take a value which is deviated from the transmittances of the respective regions. Therefore, in order to ensure that the ratio of the pixel values takes the desired value, the amount of crosstalk may be previously measured through simulation or experimentation, and the transmittances of the optical regions D1, D2, D3, and D4 on the optical device L1 may be appropriately set. In the present embodiment, in order to ensure that the ratio of pixel values of the pixel P1, pixel P2, pixel P3, and pixel P4 is 64:16:4:1, a ratio of transmittances between the optical regions D1, D2, D3, and D4 on the optical device L1, as determined through a simulation, would be 92:21.8:4.8:1.

Next, a method of generating an image with a high dynamic range from the pixel values of the pixels P1, P2, P3, and P4 will be described.

Figure 13:
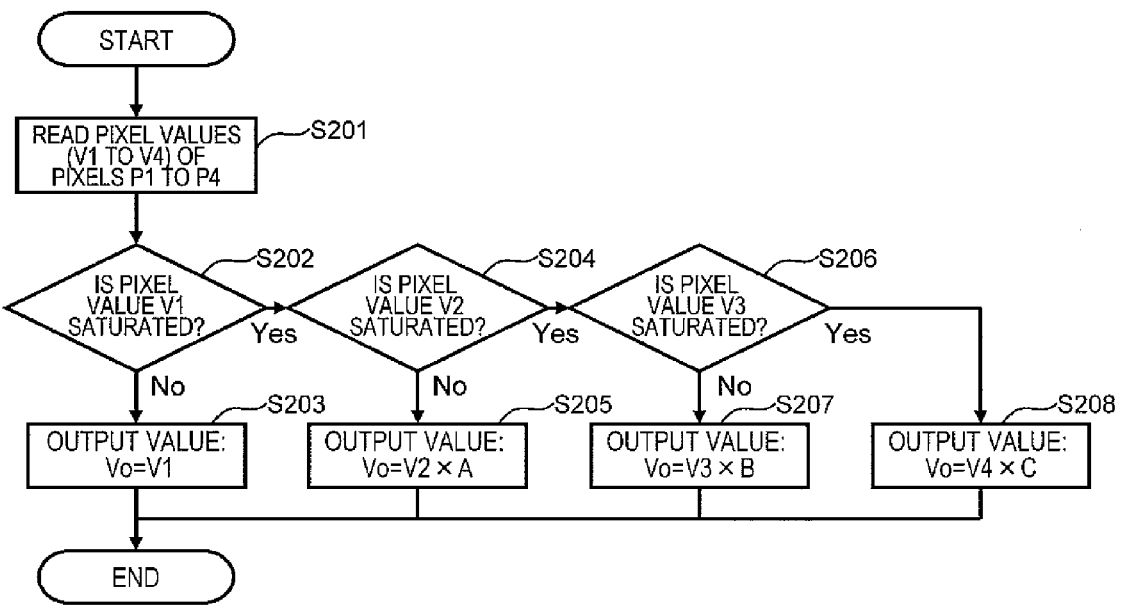
FIG. 13 A flowchart for generating an image with a high dynamic range according to Embodiment 2 of the present invention.

FIG. 13 is a flowchart of generating an image with a high dynamic range from the pixel values of the pixels P1, P2, P3, and P4. This process is executed by the signal processing section C in FIG. 1. It is assumed that the pixel values of the pixels P1, P2, P3, and P4 are 8 bits (256 gray scale levels).

First, at step S101, one each from the pixels P1, P2, P3, and P4, i.e., four pixels that are located within the same unit region M21 (e.g., pixels P1A, P2A, P3A, P4A), are selected, and the pixel values thereof are read from the imaging device. It is assumed that the pixel values of the pixels P1, P2, P3, and P4 are V1, V2, V3, and V4, respectively.

Next, at step S202, it is determined whether the pixel P1 is saturated or not. Since the amount of information of each pixel is 8 bits, a pixel value of 255 is to be determined as saturated, and any pixel value that is less than 255 is to be determined as not saturated.

If step S202 finds that the pixel P1 is not saturated, the pixel value V1 is output as an output value Vo at step S203.

On the other hand, if step S202 finds that the pixel P1 is saturated, it is determined at step S204 whether the pixel P2 is saturated or not. If the pixel P2 is not saturated (No from step S204), at step S205, a value which is obtained by multiplying the pixel value V2 by the ratio A between the transmittances of the optical regions D1 and D2 of the optical device L1 (A=4 in the present embodiment) becomes the output value Vo. If the pixel P2 is saturated (Yes from S204), it is determined at step S206 whether the pixel P3 is saturated or not. If the pixel P2 is not saturated (No from S206), a value obtained by multiplying the pixel value V3 by a ratio B between the transmittances of the optical regions D1 and D3 of the optical device L1 (B=16 in the present embodiment) becomes the output value Vo (S207). If the pixel P3 is saturated (Yes from S206), a value obtained by multiplying the pixel value V4 by a ratio C between the transmittances of the optical regions D1 and D4 of the optical device L1 (C=64 in the present embodiment) becomes the output value Vo (S208). By conducting the above calculation for every one of the pixels P1, P2, P3, and P3, image information with a high dynamic range can be generated.

In the present Embodiment 2, since C=64, the information value of the image which is generated at step S208 is 14 bits. In order to allow the generated 14-bit image to be displayed on an 8-bit display, for example, it is necessary to compress its dynamic range. If compression is performed by proportionally compressing the pixel values themselves, the image information in dark portions will be lost. Therefore, the dynamic range is desirably compressed while conserving the gray scale characteristic of the dark portions, by using logarithmic transformation, table conversion, or the like.

As described above, in the present Embodiment 2, an image with a higher dynamic range can be obtained than in Embodiment 1 because the image data is 14 bits.

After the image synthesis process of FIG. 12, pixel values will be missing for every other pixel along the x direction and the y direction; therefore, the pixel value of any missing pixel may be generated through complementation using the pixel values of adjoining pixels along the x direction or y direction. Specifically, if a pixel value at coordinates (x+1, y) is missing from the image, a pixel value at coordinates (x, y) and a pixel value at coordinates (x+2, y) may be averaged to complement the pixel value at coordinates (x+1, y). If a pixel value at coordinates (x, y+1) is missing, a pixel value at coordinates (x, y) and a pixel value at coordinates (x, y+2) may be averaged to complement the pixel value at coordinates (x, y+1). Moreover, if a pixel value at coordinates (x+1, y+1) is missing, a pixel value at coordinates (x, y) and a pixel value at coordinates (x+2, y+2) may be averaged to complement the pixel value at coordinates (x+1, y+1).

Figure 14:
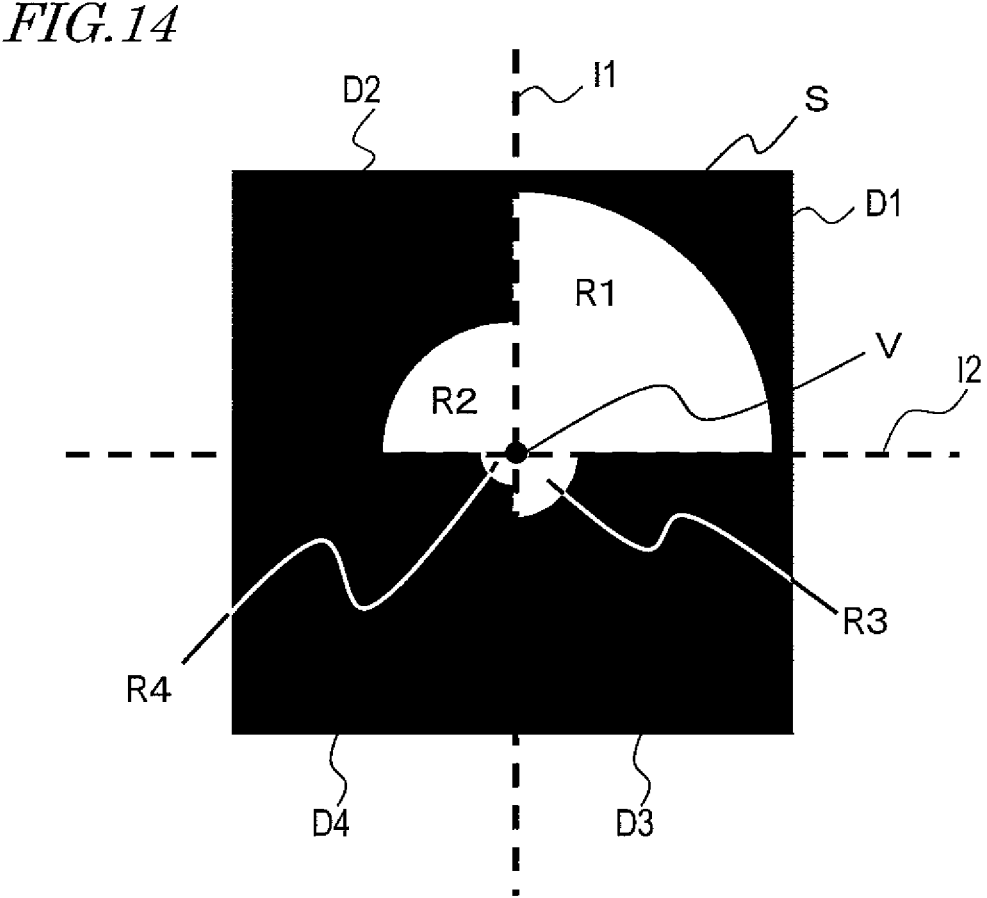
FIG. 14 A front view showing a stop S according to Embodiment 2 of the present invention from the subject side.

Although the present Embodiment 2 adopts a construction where the transmittances of the optical regions D1, D2, D3, and D4 are mutually different, a construction in which different aperture ratios are introduced by the stop S may be adopted, as shown in FIG. 14. In FIG. 14, optical regions D1, D2, D3, and D4 are regions obtained by dividing a plane which is perpendicular to the optical axis V of the lens optical system L with lines 1 which intersect the optical axis V. Openings R1, R2, R3, and R4 are provided respectively in the optical regions D1, D2, D3, and D4. The openings R1, R2, R3, and R4 are sectors of a circle with a central angle of 90 degrees, each opening having a different radius. With such a construction, too, it is ensured that the amounts of light reaching the pixels P1, P2, P3, and P4 are different, as in the case where the transmittance is differentiated, whereby an image with a high dynamic range can be generated from the pixel values of these pixels.

Note that the openings are not limited to the shapes shown in FIG. 14. For example, the opening areas may be adjusted by adjusting the angles of the central angles of sectors of a circle having the same radius, or circles or rectangles of mutually different areas may be provided, one for each, in the optical regions D1, D2, D3, and D4.

Embodiment 3

The present Embodiment 3 differs from Embodiment 2 in that the optical device L1 is divided into regions of concentric circles, and that nine pixels correspond to one microlens of a microlens array which is the array optical device. In the present embodiment, any detailed description directed to similar substance to that of Embodiment 1 will be omitted.

Figure 15:
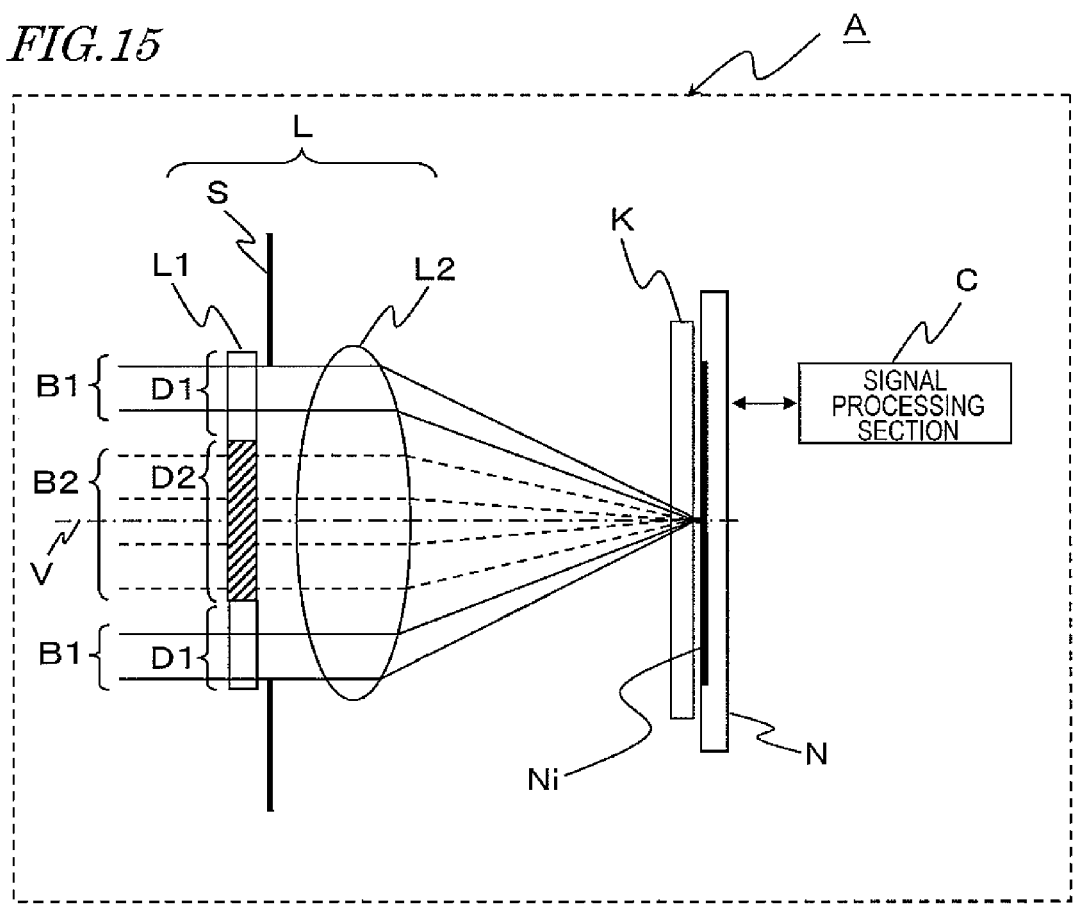
FIG. 15 A schematic diagram showing Embodiment 3 of an imaging apparatus A according to the present invention.

FIG. 15 is a schematic diagram showing Embodiment 3 of an imaging apparatus A according to the present invention. In FIG. 15, constituent elements identical to those in Embodiment 1 are denoted by the same numerals.

Figure 16:
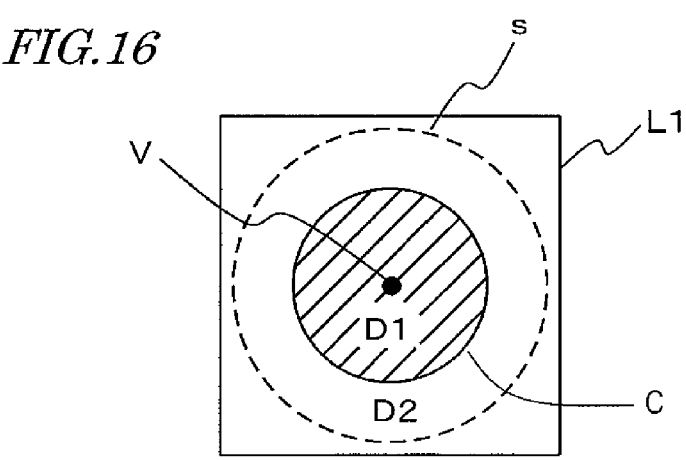
FIG. 16 A front view showing an optical device L1 according to Embodiment 3 of the present invention from the subject side.

FIG. 16 is a front view of the optical device L1 from the subject side. The optical regions D1 and D2 are regions divided by a circle C whose center is a point at which the optical axis V intersects a plane which is perpendicular to the optical axis V of the lens optical system L. The optical region D1 is a low-transmittance region, whereas the optical region D2 is a high-transmittance region. Moreover, a broken line s shows where the stop S is.

In the present embodiment, the array optical device K has a similar construction to that in the second embodiment (FIG. 10).

Figure 17:
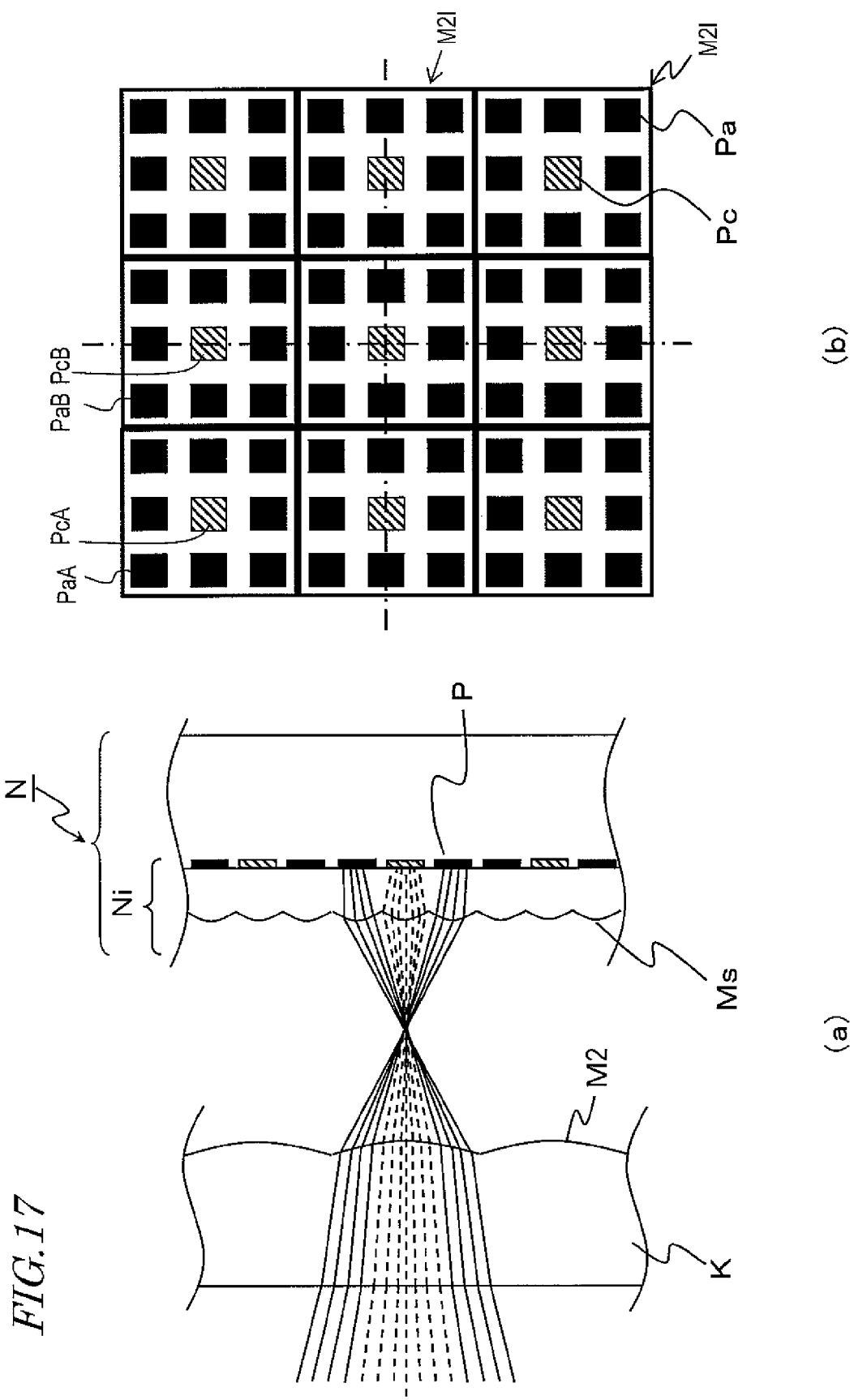
FIG. 17(a) is a diagram showing enlarged an array optical device K and an imaging device N shown in FIG. 15; and (b) is a diagram showing relative positioning of the array optical device K and pixels of the imaging device N.

FIG. 17(a) is a diagram showing enlarged the array optical device K and the imaging device N shown in FIG. 15, whereas FIG. 17(b) is a diagram showing relative positioning of the array optical device K and pixels on the imaging device N. The array optical device K is located near a focal point of the lens optical system L, and is located at a position which is a predetermined distance away from the imaging plane Ni. Moreover, the array optical device K is disposed so that its face having the optical elements M2 formed thereon faces toward the imaging plane Ni.

On the imaging plane Ni, the pixels P are disposed in a matrix shape. The pixels P are classified into pixels Pa and Pc. The pixels Pa are pixels on which a large part of the light beam passing through the optical region D2 of the optical device L1 shown in FIG. 16 (the light beam B1 indicated by solid lines in FIG. 15) is incident, whereas the pixels Pc are regions on which a large part of the light beam passing through the optical region D1 (the light beam B2 indicated by broken lines in FIG. 15) is incident. In FIG. 17(b), pixels PcA, PcB, . . . are classified as pixels Pc; and pixels PaA, PaB, . . . are classified as pixels Pa.

On the imaging plane Ni, a plurality of unit regions M2I are disposed along the vertical direction (column direction) and the lateral direction. Nine pixels of three rows and three columns are provided in each unit region M2I. The center of the nine pixels is the pixel Pc, and the other eight pixels are the pixels Pa. One unit region M2I on the imaging plane Ni corresponds to one optical element M2 of the array optical device K. On the imaging plane Ni, microlenses Ms are provided so as to cover the surface of the pixels Pc and Pa.

With such a construction, a pixel value with a small amount of exposure is generated by the pixel. Pc, while a pixel value with a high amount of exposure is generated by a sum total of the pixels Pa. From these pixel values, an image with a high dynamic range is generated by the signal processing section C in a similar manner to Embodiment 1.

Embodiment 4

The present Embodiment 4 differs from Embodiments 1 to 3 in that a lenticular lens or a microlens array is formed on the imaging plane. In the present embodiment, any detailed description directed to similar substance to that of Embodiments 1 to 3 will be omitted.

Figure 18:
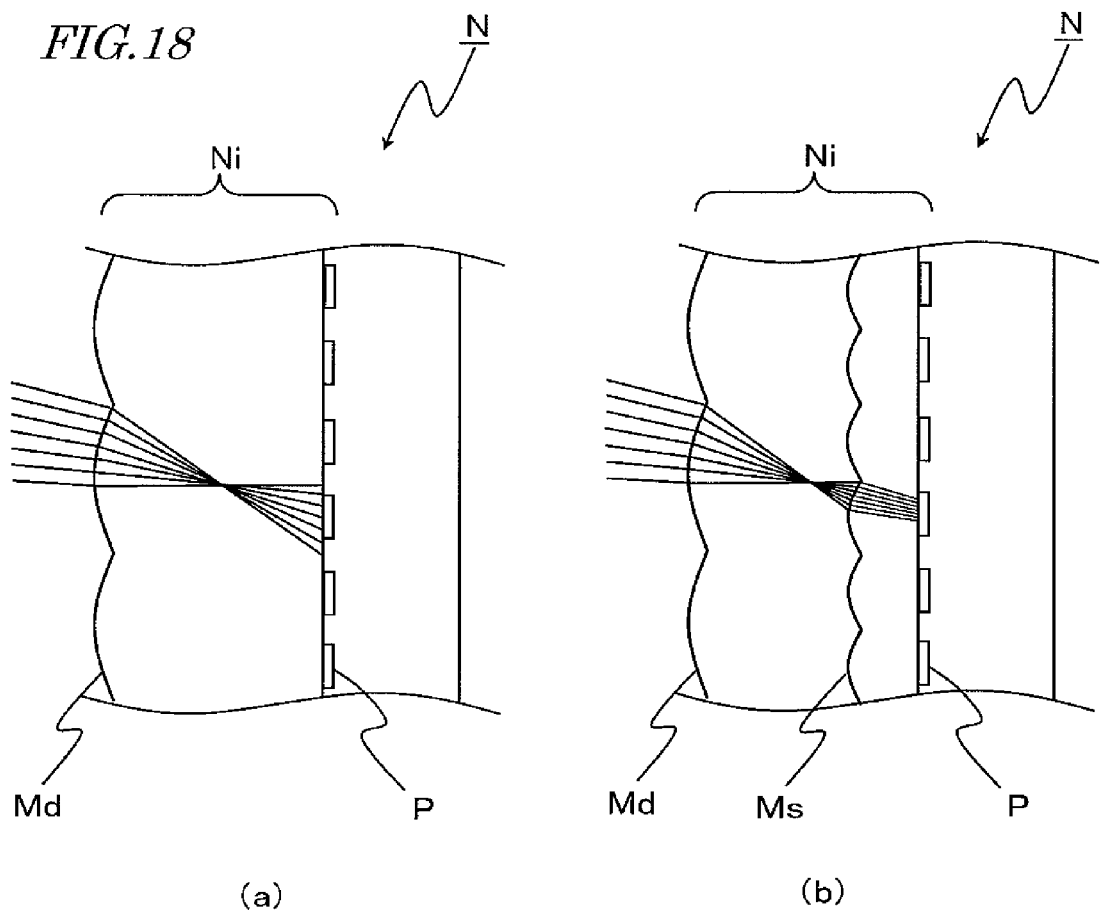
FIGS. 18(a) and (b) are diagrams showing enlarged an array optical device K and an imaging device N according to Embodiment 4 of the present invention.

FIGS. 18(a) and (b) are diagrams showing, enlarged, array optical devices K and imaging devices N. In the present embodiment, a lenticular lens (or a microlens array) Md is formed on an imaging plane Ni of an imaging device N. On the imaging plane Ni, pixels P are disposed in a matrix shape, as in Embodiment 1 and the like. One optical element of a lenticular lens, or a microlens corresponds to such plural pixels P. As in Embodiments 1 to 3, light beams passing through different regions of the optical device L1 can be led to different pixels according to the present embodiment. FIG. 18(b) is a diagram showing a variant of the present embodiment. With the construction shown in FIG. 18(b), microlenses Ms are formed on the imaging plane Ni so as to cover the pixels P, and an array optical device is stacked on the surface of the microlenses Ms. The construction shown in FIG. 18(b) provides for an enhanced efficiency of convergence over the construction of FIG. 18(a).

In the case where the array optical device is separated from the imaging device as in Embodiment 1, it is difficult to establish alignment between the array optical device and the imaging device. On the other hand, forming the array optical device K on the imaging device as in the present Embodiment 3 permits alignment in a wafer process. This facilitates alignment, whereby the accuracy of alignment can be improved.

Embodiment 5

The present Embodiment 5 differs from Embodiment 1 in that the pixels corresponding to each optical element of the array optical device are differentiated by color. Herein, any detailed description directed to similar substance to that of any of Embodiments 1 to 3 will be omitted.

Figure 19:
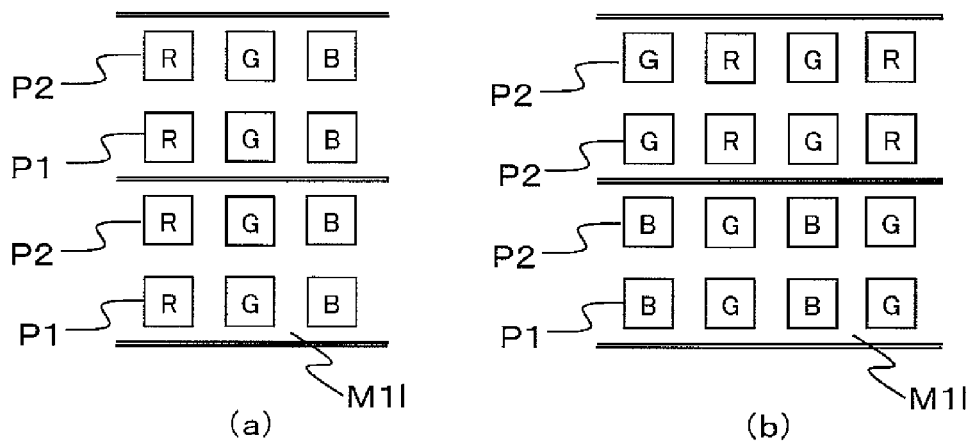
FIGS. 19(a) and (b) are diagrams showing relative positioning of an array optical device K and pixels of an imaging device N according to Embodiment 5 of the present invention.

In the present embodiment, as shown in FIG. 19(a), one row of pixels P1 and one row of pixels P2 are disposed in a unit region Mix on the imaging plane (a region corresponding to one lenticular optical element M1). The pixels P1 and P2 are each differentiated into the colors of R(red), G(green), and B(blue). In other words, as each of the pixels P1 and P2, a pixel for detecting light of either R(red), G(green), or B(blue) is provided. Specifically, a filter for transmitting light of a different wavelength band may be provided on the surface of each of the pixels P1 and P2. With such a construction, light of any one of the colors of R(red), G(green), and B(blue) can be mainly detected.

FIG. 19(b) is a diagram showing a variant of the present embodiment. In the construction shown in FIG. 19(b), G(green) and R(red) pixels are in iterative arrays within a unit region M1I on the imaging plane (a region corresponding to one lenticular optical element M1), while B(blue) and G(green) pixels are in iterative arrays in a unit region M1I next to that unit region M1I.

With the construction of the present embodiment, it is possible to generate a color image.

Note that a single pixel image may be generated from the information which is obtained from the six pixels within one unit region M1I shown in FIG. 19(a). Moreover, a single pixel image may be generated from information obtained from two upper and lower pixels in one optical element M1 shown in FIG. 19(a). In the case of generating a single pixel image by using information which is obtained from two red (R) pixels, for example, blue (B) and green (G) information is to be complemented for this single pixel image. As the blue (B) and green (G) information, the information from pixels disposed around the red (R) pixels in FIG. 19(a) may be used.

Embodiment 6

The present Embodiment 6 differs from Embodiment 1 in that the pixels are differentiated by color, from optical element to optical element. Herein, any detailed description directed to similar substance to that of any of Embodiments 1 to 3 will be omitted.

In the present embodiment, as shown in FIG. 20(a), two rows of pixels P are disposed in a unit region M1I on the imaging plane (a region corresponding to one lenticular optical element M1). For example, pixels P1 are disposed in the upper row of the two rows of pixels P, while pixels P2 are provided in the lower row. In the present embodiment, the pixels P1 and P2 which are provided in one unit region M1I of a lenticular lens are all in the same color. From unit region M1I to unit region M1I, the pixels P1 and P2 are differentiated by color, constituting iterative arrays. By having a filter for transmitting light of a different wavelength band, the pixels P1 and P2 are able to mainly detect light of any one of the colors of R(red), G(green), and B(blue).

FIG. 20(b) is a diagram showing a variant of the present embodiment. In the construction shown in FIG. 20(b), pixels P1, P2, P3, and P4 within a unit region M21 on the imaging plane (a region corresponding to one optical element M2 of the microlens) are all in the same color. From optical element M2 to optical element M2, the pixels P1, P2, P3, and P4 are differentiated by color, constituting iterative arrays.

With such a construction, a color image can be generated in a similar manner to Embodiment 5.

Embodiment 7

The present Embodiment 7 differs from Embodiment 1 in that the optical regions D1 and D2 are a plurality of regions separated so as to sandwich the optical axis, and that the array optical device is changed from lenticular elements to microlenses. Herein, any detailed description directed to similar substance to that of Embodiment 1 will be omitted.

Figure 21:
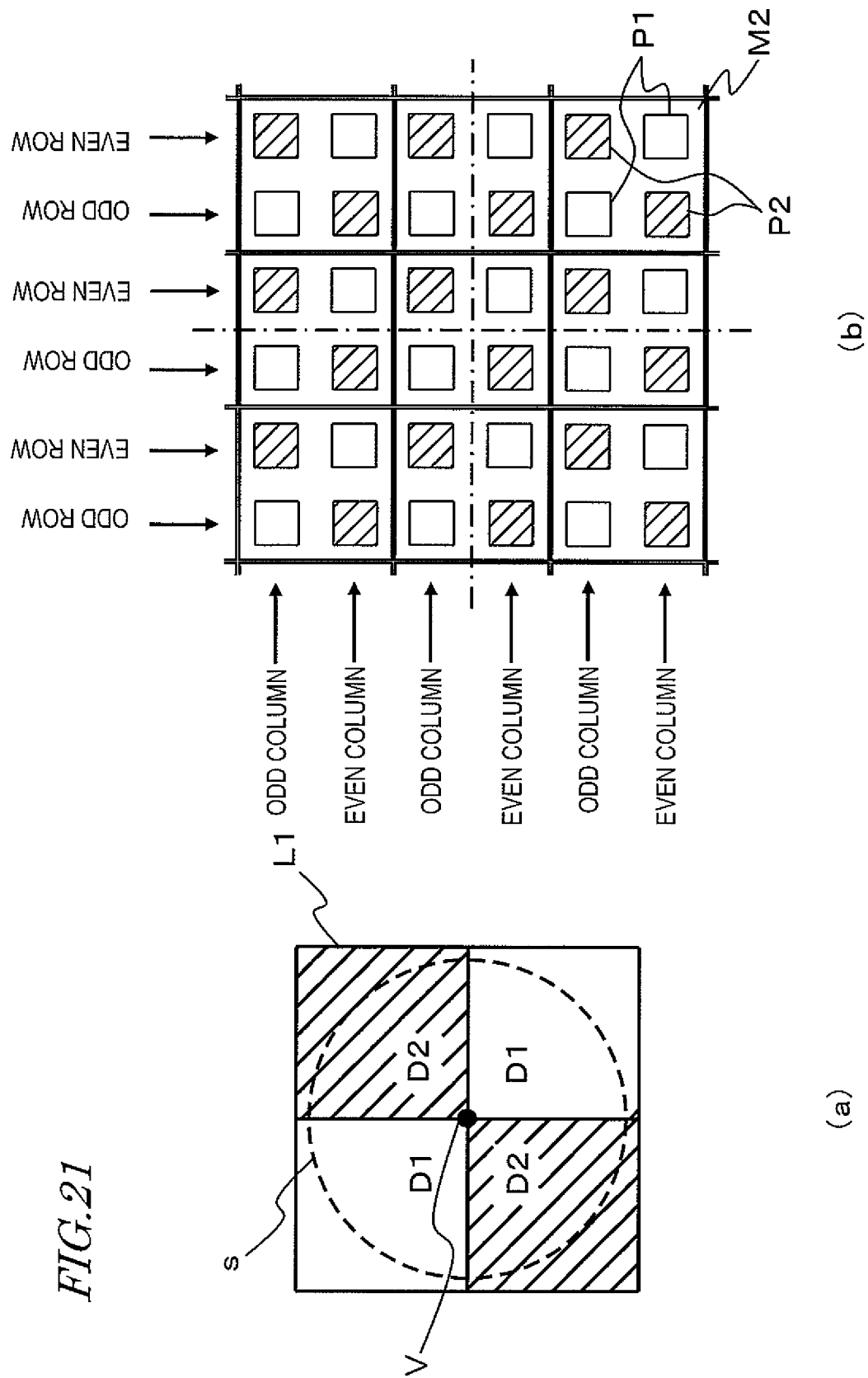
FIG. 21(a) is a front view showing the optical device L1 from the subject side; and (b) is a diagram showing relative positioning of the array optical device K and pixels of the imaging device N.

FIG. 21(a) is a front view showing the optical device L1 from the subject side. In FIG. 21(a), the optical device L1 is divided into four rotation-symmetric regions (two optical regions D1 and two optical regions D2) around the optical axis V, in a plane which is perpendicular to the optical axis of the lens optical system. The optical regions D1 and D2 are provided alternatingly, in such a manner that neither the two optical regions D1 nor the two optical regions D2 adjoin each other. The two optical regions D1 are of a point-symmetric relationship with each other, around the optical axis as a center (point of tangency). Similarly, the two optical regions D2 are of a point-symmetric relationship with each other, around the optical axis as a center (point of tangency).

FIG. 21(b) is a diagram showing relative positioning of the array optical device K and pixels on the imaging device N. In the present Embodiment 7, rays passing through the optical region D1 reach the odd rows in odd columns and the even rows in even columns. Therefore, among the pixels corresponding to an optical element M2, the pixel values of odd rows and odd columns and the pixel values of even rows and even columns are added. Since rays passing through the optical region D2 reach the even row odd column and the odd row even column, among the pixel corresponding to an optical element M2, the pixel values of even rows and odd columns and the pixel values of odd rows and even columns are added to generate an image.

Next, effects obtained in the present embodiment will be discussed in comparison with the effects obtained in Embodiment 1.

In Embodiment 1, as shown in FIG. 2, the optical region D1 and the optical region D2 are two divided regions of semicircular shape. Therefore, the barycenter of a spot of light passing through each region on the image surface may vary depending on the subject distance, thus causing misalignment.

FIG. 22 is ray diagrams for different subject distances and diagrams schematically illustrating point images and changes in their barycenters, where, in Embodiment 1, the optical region D1 is a plane and the optical region D2 is a spherical surface. In FIG. 22, (a1), (b1), and (c1) show ray diagrams with respect to different subject distances. In (a1), (b1), and (c1) of FIG. 22, an object point O is shown as the subject. Herein, description of any numerals in FIG. 1 which are similar to those in FIG. 22 will be omitted. In FIG. 22, (a2), (b2), and (c2) are image information of point images which are obtained as light from the object point O passing through the optical region D1 reaches pixels of odd columns via the lenticular elements. In FIG. 22, (a3), (b3), and (c3) are image information of point images which are obtained as an image of the object point O passing through the optical region D2 reaches pixels of even columns via the lenticular elements. In the respective image information, the image of the object point O has a semicircular shape. In FIG. 22, (a2), (a3), (b2), (b3), (c2), and (c3) show barycenters (black dots) of illuminance of the respective images.

The respective image information is schematically shown as a twofold expansion along the Y direction, obtained through a complementation process, of the image information (a2, b2, c2) which is extracted for every odd column of pixels or the image information (a3, b3, c3) which is extracted for every even column of pixels.

As shown in FIG. 22, the spot diameter changes with the position of the object point O (subject distance). Since the image information obtained by light respectively passing through the optical regions D1 and D2 each has a semicircular shape, the distance d between the barycenters of the respective point images of the image information from pixels of odd columns and the image information from pixels of even columns varies depending on the position of the object point. Presence of this distance d between the barycenters is undesirable because it will cause a misalignment at the time of image synthesis.

On the other hand, according to the present Embodiment 7, the optical regions D1 and D2 are disposed so as to be point-symmetric around the optical axis as a center, and therefore the distance d between the barycenters of the point images do not vary even if the subject distance changes.

FIG. 23 is a diagram schematically describing point images at different subject distances and changes in the barycenters thereof, according to the present embodiment. In FIG. 23, (a1) and (a2), (b1) and (b2), and (c1) and (c2) show point images (indicated as semicircles) obtained by imaging an object point O through a microlens and the barycenters (black dots) thereof, respectively corresponding to the subject distances of the object point O shown in (a1), (b1), and (c1) of FIG. 22.

In FIG. 23, (a1), (b1), and (c1) are image information of point images each obtained by adding the pixel values of pixels of odd rows and odd columns and pixels of even rows and even columns. In FIG. 23, (a2), (b2), and (c2) are image information of point images each obtained by adding the pixel values of pixels of even rows and odd columns and pixels of odd rows and even columns. As shown in FIG. 23, in the present Embodiment 7, each point image has the shape of opposing sectors of a circle, having a central angle of 90°, around the optical axis as a center. Therefore, the distance d between the barycenters of the respective point images in the image information obtained by adding the pixel values of pixels of odd rows and odd columns and even rows and even columns and the image information obtained by adding the pixel values of pixels of even rows and odd columns and odd rows and even columns is always zero, and does not change with the subject distance.

Thus, in the present Embodiment 7, by disposing the optical regions D1 and D2 so as to be separated with the optical axis sandwiched therebetween, it is ensured that the image position in the acquired image information is not shifted even if the subject distance changes. As a result, misalignments during image synthesis can be suppressed.

Embodiment 8

Figure 24:
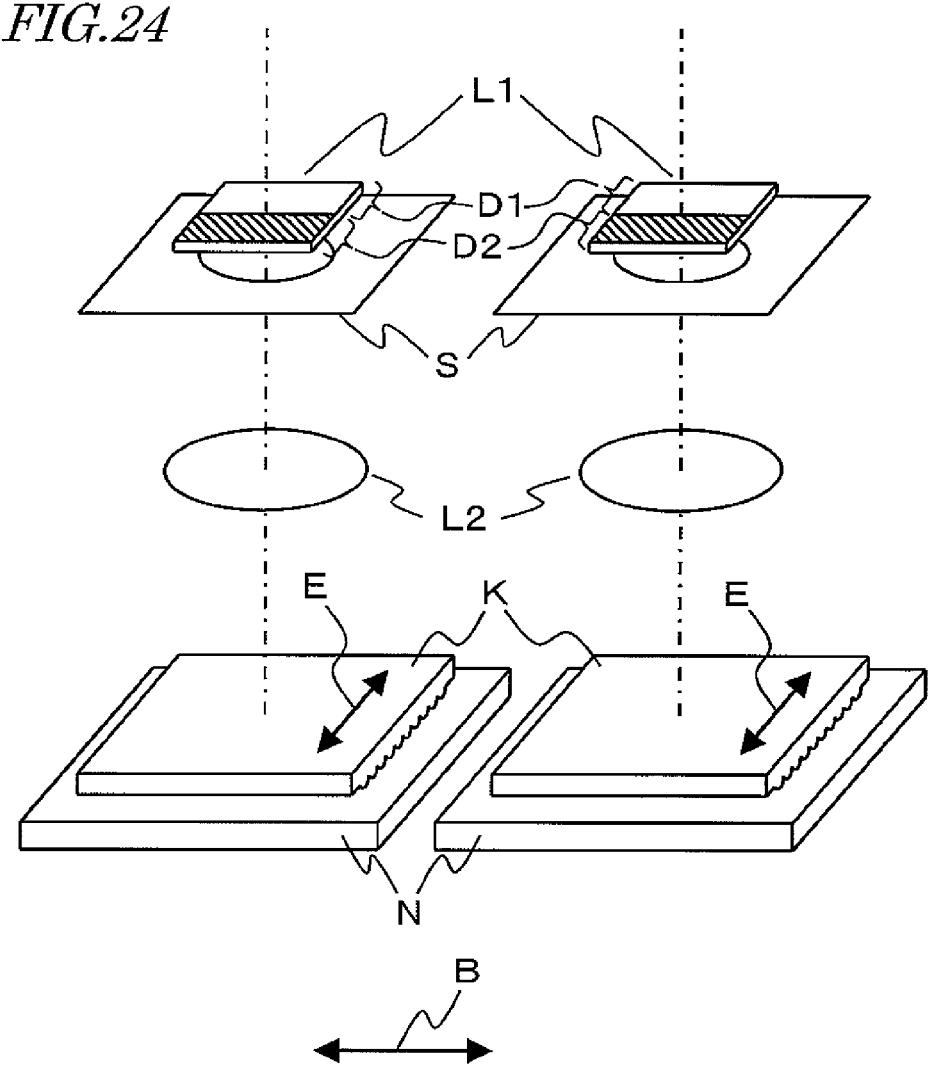
FIG. 24 A schematic illustration of a distance measuring apparatus according to Embodiment 8 of the present invention.

The present embodiment is directed to a distance measuring apparatus in which a plurality of imaging apparatuses described in Embodiment 1 are used. FIG. 24 is a schematic illustration of a distance measuring apparatus in which two imaging apparatuses are used. Constituent elements in FIG. 24 are denoted by similar numerals to those in FIG. 5. In the present embodiment, the array optical device is lenticular, and an arraying direction E of lenticular optical elements of each imaging apparatus is orthogonal to a base line direction B of the distance measuring apparatus. In the distance measuring apparatus, a parallax is extracted through pattern matching, and by using the extracted parallax, a distance to the subject is calculated based on triangulation principles. Therefore, by placing the arraying direction E of the lenticular optical elements so as to be orthogonal to the base line direction B of the distance measuring apparatus, the resolution of parallax extraction can be increased as compared to the case where the arraying direction E of the lenticular optical elements is identical to the base line direction B of the distance measuring apparatus.

With the distance measuring apparatus of the present embodiment, in a high dynamic range environment, whitening out or blacking out of an image can be reduced, thereby enabling distance measurement even in regions where conventional imaging apparatuses would suffer from whitening out or blacking out.

Other Embodiments

In Embodiments 1 to 7, the lens L2 is illustrated as being a single lens; however, the lens L2 may be composed of a plurality of groups or a plurality of lenses.

Figure 25:
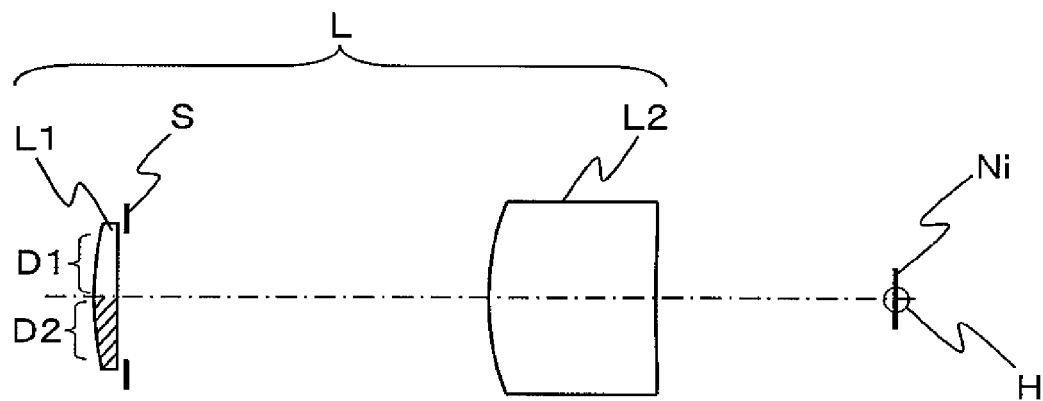
FIG. 25 A cross-sectional view of an imaging apparatus according to another embodiment of the present invention.

Moreover, the plurality of optical regions may be formed on the surface of a lens which is disposed near the stop, as shown in FIG. 25. FIG. 25 is a cross-sectional view in the case where the optical device L1 in FIG. 5 is replaced by a lens. Constituent elements in FIG. 25 are denoted by similar numerals to those in FIG. 5.

Although the optical device L1 is disposed on the subject side of the position of the stop, it may be on the image side of the position of the stop.

Although the lens optical system L is illustrated as an image-side telecentric optical system in Embodiments 1 to 7 described above, it may be an image-side nontelecentric optical system. FIG. 26(a) is a diagram showing enlarged the neighborhood of an imaging section. FIG. 26(a) shows, within the light passing through the array optical device K, only a light beam which passes one optical region. As shown in FIG. 26(a), when the lens optical system L is a nontelecentric optical system, rays obliquely enter at peripheral portions of the imaging plane, and thus light leaking to adjoining pixels is likely to cause crosstalk. However, by allowing the array optical device to be offset by Δ from the pixel array as shown in FIG. 26(b), crosstalk can be reduced. Since the incident angle will vary depending on the image height, the offset amount Δ may be set in accordance with the incident angle of the light beam onto the imaging plane. Note that, in an image-side nontelecentric optical system, the incident angle of rays at the focal point of the optical system is unequivocally determined by the position of the rays passing through the aperture S and the angle of view.

Instead of the dielectric multilayer film used in the present Embodiments 1 to 7, an ND filter (neutral-density filter) may be provided. In this case, total reflection of light may possible occur at the boundary surface between the region where an ND filter is provided and the regions where it is not provided. Therefore, a light-shielding member covering the boundary surface may provided on the object-face side of the boundary surface, whereby unnecessary light is prevented from entering each pixel. As a light-shielding member Q, for example, a polyester film which is kneaded with carbon black or the like may be used.

Figure 27:
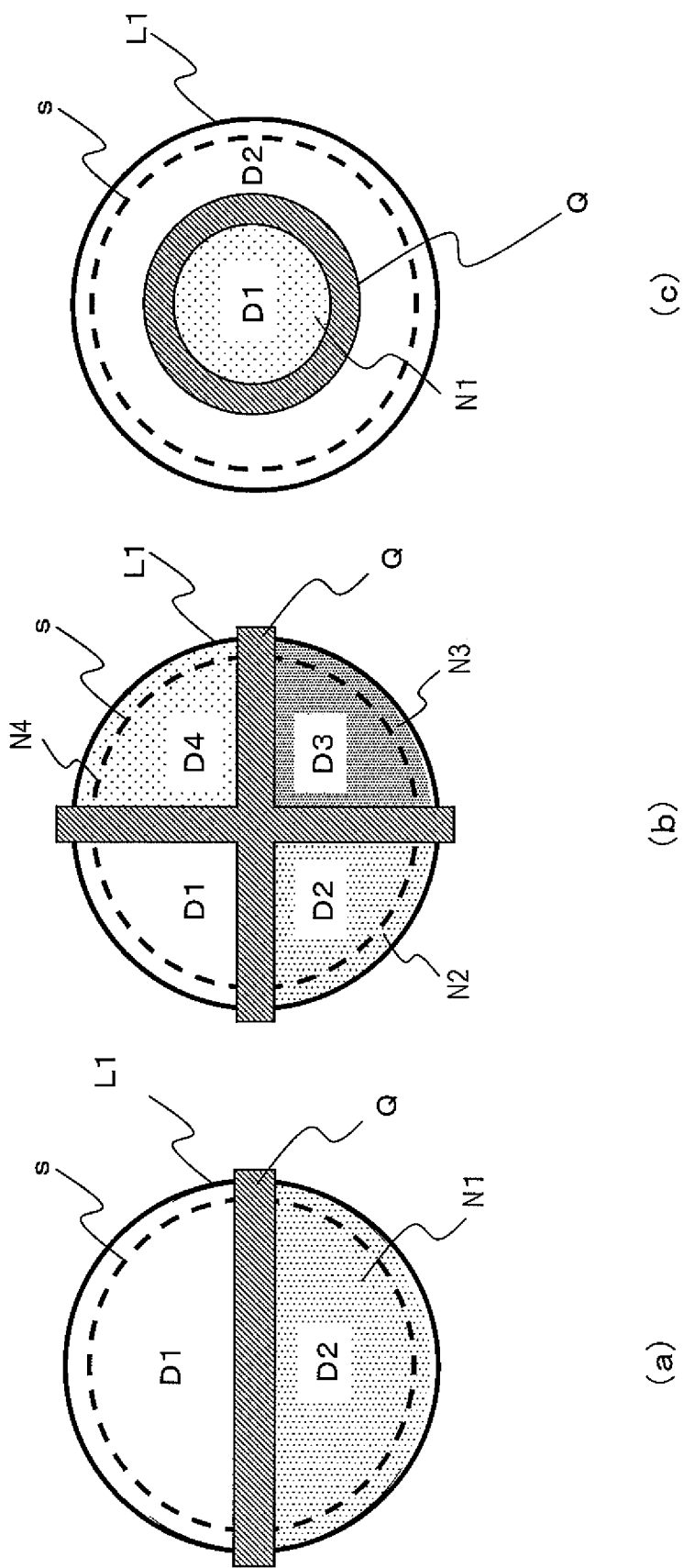
FIG. 27(a) to (c) are diagrams showing optical devices L1 in which a light-shielding member Q is provided at a boundary surface.

FIGS. 27(a) to (c) are diagrams showing optical devices L1 in which a light-shielding member Q is provided at a boundary surface. In the optical device L1 shown in FIG. 27(a), for example, an ND filter N1 is provided in the optical region D2 whereas transparent glass is provided in the optical region D1. In this case, a light-shielding member Q may be provided at the boundary between the optical regions D1 and D2. In the optical device L1 shown in FIG. 27(b), for example, ND filters N2, N3, and N4 are provided in the optical regions D2, D3, D4 whereas transparent glass is provided in the optical region D1. The ND filters N2, N3, and N4 have respectively different light attenuating effects. In FIG. 27(b), a light-shielding member Q may be provided at the respective boundaries between the optical regions D1, D2, D3, and D4. In the optical device L1 shown in FIG. 27(c), similarly to FIG. 27(a), for example, an ND filter N1 is provided in the optical region D1 and no ND filter is provided in the optical region D2. In this case, a light-shielding member Q may be provided at the boundary between the optical regions D1 and D2. Note that, also in the case of differentiating the amount of exposure on the basis of a dielectric multilayer film or the opening area of a stop, a light-shielding member may be provided at the boundary portion between optical regions.

The light-shielding member may be formed integrally with the stop.

Since rays passing near the boundaries between regions may be a cause of crosstalk, a light-shielding member may be provided at the boundaries between regions even in the case where divided filters are not employed to compose the respective regions.

Each optical element (microlens) of the microlens array according to the present Embodiments 2 to 7 preferably have a rotation-symmetric shape with respect to the optical axis. This will be discussed below in comparison with microlenses of a shape which is rotation-asymmetric with respect to the optical axis.

FIG. 28(a1) is a perspective view showing a microlens array having a shape which is rotation-asymmetric with respect to the optical axis. Such a microlens array is formed by forming quadrangular prisms of resist on the array and rounding the corner portions of the resist through a heat treatment, and performing a patterning by using this resist. The contours of a microlens shown in FIG. 28(a1) are shown in FIG. 28(a2). In a microlens having a rotation-asymmetric shape, there is a difference in radius of curvature between the vertical and lateral directions (directions parallel to the four sides of the bottom face of each microlens) and oblique directions (diagonal direction of the bottom face of the microlens).

FIG. 28(a3) is a diagram showing ray tracing simulation results in the case where the microlenses shown in FIGS. 28(a1) and (a2) are applied to the array optical device according to the present invention. Although FIG. 28(a3) only shows a light beam which passes through only one optical region within the light passing through the array optical device K, a microlens of a rotation-asymmetric shape will allow light to leak to adjoining pixels, thus causing crosstalk.

FIG. 28(b1) is a perspective view showing a microlens array having a shape which is rotation-symmetric with respect to the optical axis. Microlenses of such a rotation-symmetric shape can be formed on a glass plate or the like by a thermal imprinting or UV imprinting manufacturing method.

FIG. 28(b2) shows contours of a microlens having a rotation-symmetric shape. In a microlens having a rotation-symmetric shape, the radius of curvature is identical between the vertical and lateral directions and oblique directions.

FIG. 28(b3) is a diagram showing ray tracing simulation results in the case where the microlenses shown in FIGS. 28(b1) and (b2) are applied to the array optical device according to the present invention. Although FIG. 28(b3) only shows a light beam which passes through only one optical region within the light passing through the array optical device K, it can be seen that no crosstalk such as that in FIG. 28(a3) is occurring. Thus, crosstalk can be reduced by adopting a rotation-symmetric shape for the microlenses, whereby an image with a higher sharpness (or contrast) can be obtained. When a very bright image is imaged, pixel information which would otherwise be unsaturated may possibly become saturated due to crosstalk, thus causing a reduction in the dynamic range. Reducing crosstalk can suppress reduction in the dynamic range.

INDUSTRIAL APPLICABILITY

The imaging apparatus according to the present invention is useful for imaging apparatuses such as digital still cameras or digital camcorders. It is also applicable to imaging apparatuses for monitoring the surroundings or monitoring people riding in an automobile, imaging apparatuses for monitor cameras, and distance measuring apparatus applications.

REFERENCE SIGNS LIST

A imaging apparatus
B base line direction
B1, B2 light beam
C signal processing section
D1, D2, D3, D4 optical region
E arraying direction
H region
K array optical device
L lens optical system
L1 optical device
L2 lens
N imaging device
Ni imaging plane
N1, N2, N3, N4 ND filter
Md lenticular lens
Ms microlens
M1, M2 optical element
M1I, M2I unit region
O object point
P1, P2, P3, P4, P pixel
R1, R2 opening
S stop

The invention claimed is:

1. An imaging apparatus comprising:
a lens optical system having a lens and a stop;
an imaging device at least including a plurality of first pixels and a plurality of second pixels on which light passing through the lens optical system is incident;
an array optical device disposed between the lens optical system and the imaging device, the array optical device including a plurality of optical elements; and
a signal processing section for generating an image by using a plurality of pixel values obtained at the plurality of first pixels and a plurality of pixel values obtained at the plurality of second pixels, wherein,
the lens optical system is divided into two regions that have a first region and a second region in the stop or in a plane substantially perpendicular to an optical axis and near the stop;
the array optical element is a lenticular lens in which the plurality of optical elements that are elongated along a lateral direction are disposed in a vertical direction, each of the plurality of optical elements being arranged so as to correspond to two rows of pixels that includes one row of the plurality of first pixels and one row of the plurality of second pixels;
the array optical device causes light passing through the first region to enter the plurality of first pixels, and causes light passing through the second region to enter the plurality of second pixels;
the first region and the second region have substantial equal area, a proportion of an amount of light entering the first region relative to an amount of light exiting the first region being substantially uniform within the first region, and a proportion of an amount of light entering the second region relative to an amount of light exiting the second region being substantially uniform within the first region; and
a proportion of an amount of light exiting the second region relative to an amount of light entering the second region is smaller than a proportion of an amount of light exiting the first region relative to an amount of light entering the first region;
wherein transmittances of light at each wavelength are the same in each of the first region and the second region.

2. The imaging apparatus of claim 1, wherein the lens optical system is an image-side telecentric optical system.

3. The imaging apparatus of claim 1, wherein,
the lens optical system is an image-side nontelecentric optical system; and
off the optical axis of the lens optical system, an array of the array optical device is offset from an array of pixels of the imaging device.

4. The imaging apparatus of claim 1, wherein the array optical device is formed on the imaging device.

5. The imaging apparatus of claim 1, further comprising a microlens provided between the array optical device and the imaging device, wherein
the array optical device is formed on the imaging device via the microlens.

6. The imaging apparatus of claim 1, wherein the plurality of first pixels and the plurality of second pixels have filters transmitting light of different wavelength bands.

7. The imaging apparatus of claim 1, wherein a light-shielding member is provided at a boundary between the first region and the second region of the lens optical system.

8. A distance measuring apparatus comprising a plurality of imaging apparatuses claim 1.

9. The imaging apparatus of claim 1, wherein,
an amount of light supplied from the plurality of first regions to the plurality of first pixels is k times (k>1) as much as an amount of light supplied from the plurality of second regions to the plurality of second pixels; and
the signal processing section performs a process of reading a pixel value V1 obtained at a pixel P1, the pixel P1 being one of the plurality of first pixels, and a pixel value V2 obtained at a pixel P2, the pixel P2 being one of the plurality of second pixels,
outputting the pixel value V1 when the pixel value V1 is not saturated, and
outputting a value obtained by multiplying the pixel value V2 at the second pixel by k when the pixel value V1 is saturated.

10. An imaging apparatus comprising:
a lens optical system having a lens and a stop;
an imaging device at least including a plurality of first pixels and a plurality of second pixels on which light passing through the lens optical system is incident;
an array optical device disposed between the lens optical system and the imaging device, the array optical device including a plurality of optical elements; and
a signal processing section for generating an image by using a plurality of pixel values obtained at the plurality of first pixels and a plurality of pixel values obtained at the plurality of second pixels, wherein,
the lens optical system is divided into two regions that have a first region and a second region in the stop or in a plane substantially perpendicular to an optical axis and near the stop;
the array optical device is a lenticular lens in which the plurality of optical elements that are elongated along a lateral direction are disposed in a vertical direction, each of the plurality of optical elements being arranged so as to correspond to two rows of pixels that includes one row of the plurality of first pixels and one row of the plurality of second pixels;
the array optical device causes light passing through the first region to enter the plurality of first pixels, and causes light passing through the second region to enter the plurality of second pixels; and
the first region and the second region have openings of mutually different area dimensions.

11. A distance measuring apparatus comprising a plurality of imaging apparatuses, each of the plurality of imaging apparatuses comprising an imaging apparatus as recited in claim 10.

12. An imaging apparatus comprising:
a lens optical system having a lens and a stop;
an imaging device at least including a plurality of first pixels, a plurality of second pixels, a plurality of third pixels and a plurality of fourth pixels on which light passing through the lens optical system is incident;
an array optical device disposed between the lens optical system and the imaging device, the array optical device including a plurality of optical elements; and
a signal processing section for generating an image by using a plurality of pixel values obtained at the plurality of first pixels, a plurality of pixel values obtained at the plurality of second pixels, a plurality of pixel values obtained at the plurality of third pixels and a plurality of pixel values obtained at the plurality of fourth pixels, wherein,
the lens optical system is divided into four regions that have a first region and a second region in the stop or in a plane substantially perpendicular to an optical axis and near the stop;
the array optical device is a microlens array in which the plurality of optical elements are arranged two-dimensionally along lateral and vertical directions, each of the plurality of optical elements being arranged so as to correspond to either one of the plurality of first pixels, one of the plurality of second pixels, one of the plurality of third pixels and one of the plurality of fourth pixels;
the array optical device causes light passing through the first, second, third and fourth regions to enter the plurality of first, second third and fourth pixels, respectively; and
the first, second, third and fourth regions have substantial equal area, a proportion of amounts of light entering the first, second, third and fourth regions relative to amounts of light exiting the first, second, third and fourth region being substantially uniform within the respective regions but different from each other among the first, second, third and fourth regions;
wherein transmittances of light at each wavelength are the same in each of the first region and the second region.

13. A distance measuring apparatus comprising a plurality of imaging apparatuses, each of the plurality of imaging apparatuses comprising an imaging apparatus as recited in claim 12.

14. The imaging apparatus of claim 12, wherein the first, second, third, and fourth regions have a ratio of light transmittances of 64:16:4:1.

15. An imaging apparatus comprising:
a lens optical system having a lens and a stop;
an imaging device at least including a plurality of first pixels, a plurality of second pixels, a plurality of third pixels and a plurality of fourth pixels on which light passing through the lens optical system is incident;
an array optical device disposed between the lens optical system and the imaging device, the array optical device including a plurality of optical elements; and
a signal processing section for generating an image by using a plurality of pixel values obtained at the plurality of first pixels, a plurality of pixel values obtained at the plurality of second pixels, a plurality of pixel values obtained at the plurality of third pixels and a plurality of pixel values obtained at the plurality of fourth pixels, wherein,
the lens optical system is divided into four regions that have a first region and a second region in the stop or in a plane substantially perpendicular to an optical axis and near the stop;
the array optical device is a microlens array in which the plurality of optical elements are arranged two-dimensionally along lateral and vertical directions, each of the plurality of optical elements being arranged so as to correspond to either one of the plurality of first pixels, one of the plurality of second pixels, one of the plurality of third pixels and one of the plurality of fourth pixels;
the array optical device causes light passing through the first, second, third and fourth regions to enter the plurality of first, second third and fourth pixels, respectively; and
the first, second, third and fourth regions have openings of mutually different area dimensions.

16. A distance measuring apparatus comprising a plurality of imaging apparatuses, each of the plurality of imaging apparatuses comprising an imaging apparatus as recited in claim 15.

* * * * *